United States Patent
Hamel et al.

(10) Patent No.: US 10,460,118 B2
(45) Date of Patent: Oct. 29, 2019

(54) SECURE STORAGE AUDIT VERIFICATION SYSTEM

(71) Applicant: Workday, Inc., Pleasanton, CA (US)

(72) Inventors: Bjorn Hamel, Dublin, CA (US); Jonathan David Ruggiero, Walnut Creek, CA (US)

(73) Assignee: Workday, Inc., Pleasanton, CA (US)

( * ) Notice: Subject to any disclaimer, the term of this patent is extended or adjusted under 35 U.S.C. 154(b) by 403 days.

(21) Appl. No.: 15/252,060

(22) Filed: Aug. 30, 2016

(65) Prior Publication Data

US 2018/0060596 A1 Mar. 1, 2018

(51) Int. Cl.
*G06F 21/62* (2013.01)
*H04L 9/32* (2006.01)
*G06F 21/64* (2013.01)

(52) U.S. Cl.
CPC .............. *G06F 21/62* (2013.01); *G06F 21/64* (2013.01); *H04L 9/3236* (2013.01); *H04L 9/3242* (2013.01); *H04L 9/3247* (2013.01); *H04L 2209/38* (2013.01)

(58) Field of Classification Search
CPC ....................................................... G06F 21/62
USPC ........................................................ 713/176
See application file for complete search history.

(56) References Cited

U.S. PATENT DOCUMENTS

| | | | |
|---|---|---|---|
| 8,161,565 B1 | 4/2012 | Langford | |
| 9,379,890 B1 | 6/2016 | Blakely | |
| 9,432,342 B1 | 8/2016 | Kothari | |
| 9,461,821 B1 | 10/2016 | Machani | |
| 9,578,017 B2 | 2/2017 | Ferguson | |
| 9,588,977 B1 | 3/2017 | Wang | |
| 9,679,276 B1 * | 6/2017 | Cuende | G06F 17/30949 |
| 9,686,072 B2 | 6/2017 | Fedronic | |
| 9,842,062 B2 | 12/2017 | Ford | |
| 9,960,920 B2 * | 5/2018 | Cuende | G06F 17/30949 |
| 2004/0146164 A1 | 7/2004 | Jonas | |
| 2005/0097348 A1 | 5/2005 | Jakubowski | |
| 2008/0140578 A1 | 6/2008 | Jean-Marc Paoli | |
| 2010/0290623 A1 | 11/2010 | Banks | |
| 2014/0129847 A1 | 5/2014 | Lee | |
| 2014/0301545 A1 | 10/2014 | Glider | |
| 2014/0351566 A1 | 11/2014 | Ito | |
| 2015/0127940 A1 * | 5/2015 | Polehn | H04L 63/0435 713/168 |
| 2015/0186671 A1 | 7/2015 | O'Hare | |

(Continued)

FOREIGN PATENT DOCUMENTS

WO 2016069243 5/2016

OTHER PUBLICATIONS

Jon Todd, "Encryption Key Storage with AWS KMS at Okta", Dec. 2015.

(Continued)

*Primary Examiner* — Khalil Naghdali
(74) *Attorney, Agent, or Firm* — Van Pelt, Yi & James LLP

(57) ABSTRACT

A system for secure storage audit verification includes a transaction pool and a processor. The processor is configured to verify a transaction stored in the transaction pool and sign a proposed block. The proposed block is based at least in part on the transaction. The processor is further configured to receive a counter signed proposed block and add the counter signed proposed block to a blockchain.

16 Claims, 22 Drawing Sheets

(56) References Cited

U.S. PATENT DOCUMENTS

| | | |
|---|---|---|
| 2015/0304310 A1 | 10/2015 | Roth |
| 2016/0027229 A1 | 1/2016 | Spanos |
| 2016/0065364 A1 | 3/2016 | Amiri |
| 2016/0065540 A1 | 3/2016 | Androulaki |
| 2016/0261408 A1 | 9/2016 | Peddada |
| 2016/0321461 A1 | 11/2016 | Oliver |
| 2016/0323250 A1 | 11/2016 | Winter |
| 2016/0365978 A1* | 12/2016 | Ganesan ............... H04L 9/3239 |
| 2017/0046689 A1* | 2/2017 | Lohe ................... G06F 12/1408 |
| 2018/0027006 A1 | 1/2018 | Zimmermann |

OTHER PUBLICATIONS

Barker et al., Recommendation for key management part 1: General (revision 3). NIST special publication, 800(57), pp. 1-147. (Year: 2012).

* cited by examiner

| Type | Field | |
|---|---|---|
| Base 64 Certificate | Client Certificate | 350 |
| String | Requested Key ID | 351 |
| String | Customer ID | 352 |
| UTC Milliseconds | Request Time | 353 |
| Type 4 UUID | Request Nonce | 354 |
| Key/Value Pairs | Operation Context | 355 |
| String | Operator Comment | 356 |
| Base 64 URL Encoded | Signature | 357 |

FIG. 3B

| Type | Field | |
|---|---|---|
| Base 64 Certificate | KMS Certificate | 550 |
| Base 64 Certificate | Client Certificate | 551 |
| String | Tenant Master Key ID | 552 |
| String | Customer Key ID | 553 |
| Base64 Encoded String | Encrypted Tenant Master Key with Customer Key | 554 |
| Base64 Encoded | Initialization Vector | 555 |
| String | Requested Key ID | 556 |
| String | Customer ID | 557 |
| UTC Milliseconds | Request Time | 558 |
| Type 4 UUID | Request Nonce | 559 |
| Key/Value Pairs | Operation Context | 560 |
| String | Operator Comment | 561 |
| Base 64 URL Encoded | Client Signature | 562 |
| Base 64 URL Encoded | KMS Signature | 563 |

FIG. 5B

| Type | Field | |
|---|---|---|
| Base 64 Certificate | KRS Certificate | 650 |
| String | Tenant Master Key ID | 651 |
| Base64 Encoded String | Encrypted Tenant Master Key with KMS Key | 652 |
| String | Customer ID | 653 |
| UTC Milliseconds | Response Time | 654 |
| Type 4 UUID | In Response to Nonce | 655 |
| Type 4 UUID | Response Nonce | 656 |
| SHA-256 | In Response to Hash | 657 |
| SHA-256 | Authorized Key Hash | 658 |
| Base 64 URL Encoded | KRS Signature | 659 |

FIG. 6B

| Type | Field | |
|---|---|---|
| int | Request ID | 722 |
| varchar(64) | Request Context Message Hash | 724 |
| int | Customer Authorization Message | 726 |
| varchar(64) | Customer Authorization Message Hash | 728 |

FIG. 7B

SECURE STORAGE AUDIT VERIFICATION SYSTEM

BACKGROUND OF THE INVENTION

A critical feature for software applications is the ability to access and modify repositories of data. The contents of a data repository can contain sensitive information. For example, data for an employment software as a service application can include users' job titles, current and previous employers, education, contact details, and other information. A prerequisite for a secure data repository is the ability to securely store the information by enforcing policies to manage the users and the use of the data.

BRIEF DESCRIPTION OF THE DRAWINGS

Various embodiments of the invention are disclosed in the following detailed description and the accompanying drawings.

FIG. 3B is a diagram illustrating an embodiment of a request object message.

FIG. 5B is a diagram illustrating an embodiment of an unlock request message.

FIG. 6B is a diagram illustrating an embodiment of an unlock response message.

FIG. 7B is table illustrating an embodiment of a release record.

DETAILED DESCRIPTION

Figure 1:
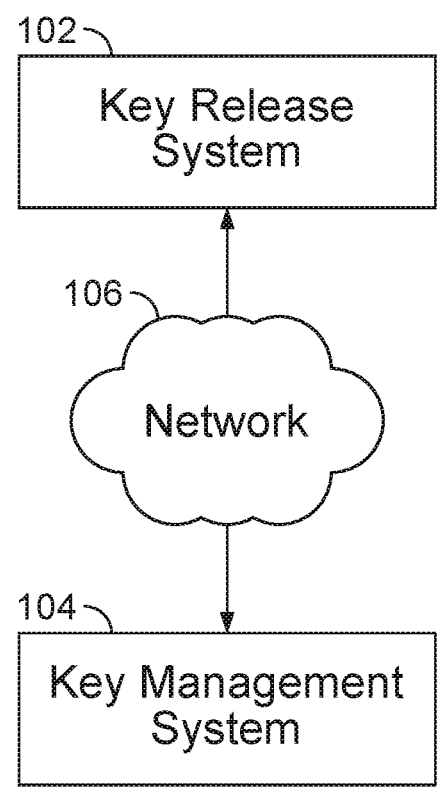
FIG. 1 is a block diagram illustrating an embodiment of a secure storage system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for secure storage of data is disclosed. The system comprises a key database and a processor. The processor is configured to receive a request associated with securely storing data and encrypt a tenant service key using a tenant master key. The data is encrypted using the tenant service key. The processor is further configured to encrypt the tenant master key using a customer key and store encrypted tenant service key and encrypted tenant master key in the key database.

A system for secure retrieval of stored data is disclosed. The system comprises an encrypted key database and a processor. The encrypted key database is configured to store an encrypted tenant service key and an encrypted tenant master key. The processor is configured to request decryption of the encrypted tenant master key into an unencrypted tenant master key. The decryption of the encrypted master key is approved by a key release system. The processor is further configured to decrypt the encrypted tenant service key using the unencrypted tenant master key into an unencrypted tenant service key and authorize a response to a request using the unencrypted tenant service key.

A system for secure storage audit verification is disclosed. The system comprises a transaction pool and a processor. The processor is configured to verify a transaction stored in the transaction pool and sign a proposed block. The proposed block is based at least in part on the transaction. The processor is further configured to receive a counter signed proposed block and add the counter signed proposed block to a blockchain.

In some embodiments, the system stores data in a repository in a secure manner by encrypting the data using multiple keys. The repository data is encrypted using a tenant service key. The tenant service key is then encrypted using a tenant master key. The tenant master key is encrypted using a customer key. The encrypted tenant service key and encrypted tenant master key are stored in a key repository. The customer key is stored in a remote hardware security module. Decrypting the secure repository data requires decrypting the encrypted tenant master key with the customer key, decrypting the encrypted tenant service key with the tenant master key, and finally decrypting the secure data with the tenant service key.

In some embodiments, the system comprises a key release system and a key management system. The key release system is to release a customer key enabling decryption of a tenant management key. The key management system is to release a tenant service key enabling decryption of requested data. The key management system comprises an encrypted key database and a processor. The encrypted key database is to store an encrypted tenant service key and an encrypted tenant master key. The processor is to receive a request; request decryption of the encrypted tenant master key into an unencrypted tenant master key, wherein the decryption of the encrypted master key is approved by the key release system; decrypt the encrypted tenant service key using the unencrypted tenant master key into an unencrypted tenant service key; authorize a response to the request using the unencrypted tenant service key; and provide the response to the request.

In some embodiments, the key management system additionally comprises an audit database and a key management system engine. The audit database is to store a log of data encrypted and decrypted and the keys used for the encryption and decryption. The key management system engine is to receive a request object; log information (e.g., a context) associated with the request object in the audit database; retrieve an encrypted tenant service key associated with the request object from the encrypted key database; retrieve an encrypted tenant master key associated with the encrypted tenant service key from the encrypted key database; generate an unlock request for the encrypted tenant master key; transmit the unlock request to the key release system; receive an unlock response in response to the unlock request (e.g., the unlock response includes a tenant master key that has been decrypted using a customer key but encrypted (second encryption) using public/private key encryption for transmission from the key release system to the key management system), extract a second encrypted tenant master key from the unlock request; decrypt the second encrypted tenant master key into an unencrypted tenant master key; decrypt the encrypted tenant service key using the unencrypted tenant master key into an unencrypted tenant service key; encrypt the unencrypted tenant service key into a second encrypted tenant service key; update the context with a key release authorization in the audit database; generate a request response (e.g., providing the tenant service key enabling the decrypting of a requested data object stored in a secure storage unit, providing the decrypted requested data object, securely providing the requested data object, etc.); and transmit the request response.

In some embodiments, the audit database(s) stored in the system are verified or authenticated using a blockchain structure. In some embodiments, the blockchain structure checks that a recent, a prior, or all transactions stored in the audit database are valid.

In some embodiments, a system enables the secure storage and retrieval of data utilizing a key release system and a key management system. For example, a user can request to perform operations on encrypted data stored in a secure data storage by requesting the release of an encryption key by the key management system. In some embodiments, the user is a human interfacing with a software application. In other embodiments, the user is automated functionality of a software application or a software agent. In various embodiments, the data is securely stored in an encrypted database. In some embodiments, each instance of a copy of customer data is a tenant and one or more services are provided for each tenant. For each service provided, the tenant has an associated tenant service key used to encrypt that service instance data. The tenant service keys are each encrypted with a tenant master key. The tenant master key is encrypted with a customer key.

In some embodiments, a request for the release of an encryption key to the secure data is initiated by a user and sent to the key management system in the form of a request object. The key management system engine receives the release request for the encryption key. In some embodiments, the request object is a request for access to a tenant service key. The key management system engine validates the request and logs the context associated with the request into an audit database. In some embodiments, the logged context comprises generating an audit record that is associated with key usage and key authorization. In some embodiments, the request object includes metadata identifying the requested tenant service key. Using the request object, an encrypted tenant service key and an encrypted tenant master key are retrieved. In some embodiments, the encrypted keys are stored in an encrypted key database.

In some embodiments, the key management system accesses a key release system over a secure network connection and uses the key release system to decrypt the encrypted tenant master key. The key management system engine generates an unlock request for the encrypted tenant master key and transmits the unlock request to the key release system. In some embodiments, the unlock request is based at least in part on the encrypted tenant master key. In the event the unlock request is accepted, an unlock response is generated by the key release system and transmitted to the key management system.

In some embodiments, the unlock request comprises the encrypted tenant master key and a customer key identifier. The key release system extracts the unlock context and decrypts the encrypted master key using a customer key corresponding to the customer key identifier. The key release system encrypts the unencrypted tenant master key with a public key associated with the key management system into a second encrypted tenant master key. In some embodiments, the unlock response comprises the second encrypted tenant master key.

In some embodiments, the unlock response received by the key management system authorizes the key management system to use the tenant master key. In some embodiments, the unlock response received by the key management system contains the second encrypted tenant master key (e.g., the second encryption is for secure transmission from the key release system to the key management system). The key management system extracts the second encrypted tenant master key from the unlock response and decrypts it using a corresponding private key associated with the key management system. In some embodiments, the second encrypted tenant master key is cached at the key management system.

In some embodiments, the decrypted second encrypted tenant master key is used to decrypt the encrypted tenant service key. In some embodiments, the decrypted tenant service key is encrypted into a second encrypted tenant service key using a public key associated with the user requesting access to the secure data storage. The key management system engine updates the previously logged context with the key release authorization. In some embodiments, the logged context comprises the second encrypted tenant service key. The key management system engine generates a request response that is transmitted to the user. In some embodiments, the request response indicates to the user that the requested access to the secure data storage has been granted and that a version of the encryption key needed to access the secure data is available for retrieval. In some embodiments, the user retrieves the second encrypted tenant service key and decrypts it using the user's private key. The user performs read and write operations on the encrypted data using the tenant service key (e.g., the decrypted second encrypted tenant service key).

FIG. 1 is a block diagram illustrating an embodiment of a secure storage system. In the example shown, key release system 102 is connected to key management system 104 via network 106. In some embodiments, key release system 102 is managed by a customer and exists in the customer's data center. In other embodiments, key release system 102 is managed by a third party management service. Still in other embodiments, key release system 102 is managed by a software as a service provider and the same entity that provides key management system 104. In various embodiments, network 106 comprises one or more of the following: the Internet, a wired network, a wireless network, a wide area network, a local area network, or any other appropriate network or combination of networks that allows secure network communication. The combination of key release system 102 and key management system 104 connected via network 106 allows a software provider to provide a customer access to a secure storage system and control over the release of the encryption keys needed to access the secure storage system. In the scenario that the customer controls the key release system 102, the customer can revoke access to the secure data by denying key requests originating from key management system 104.

Figure 2A:
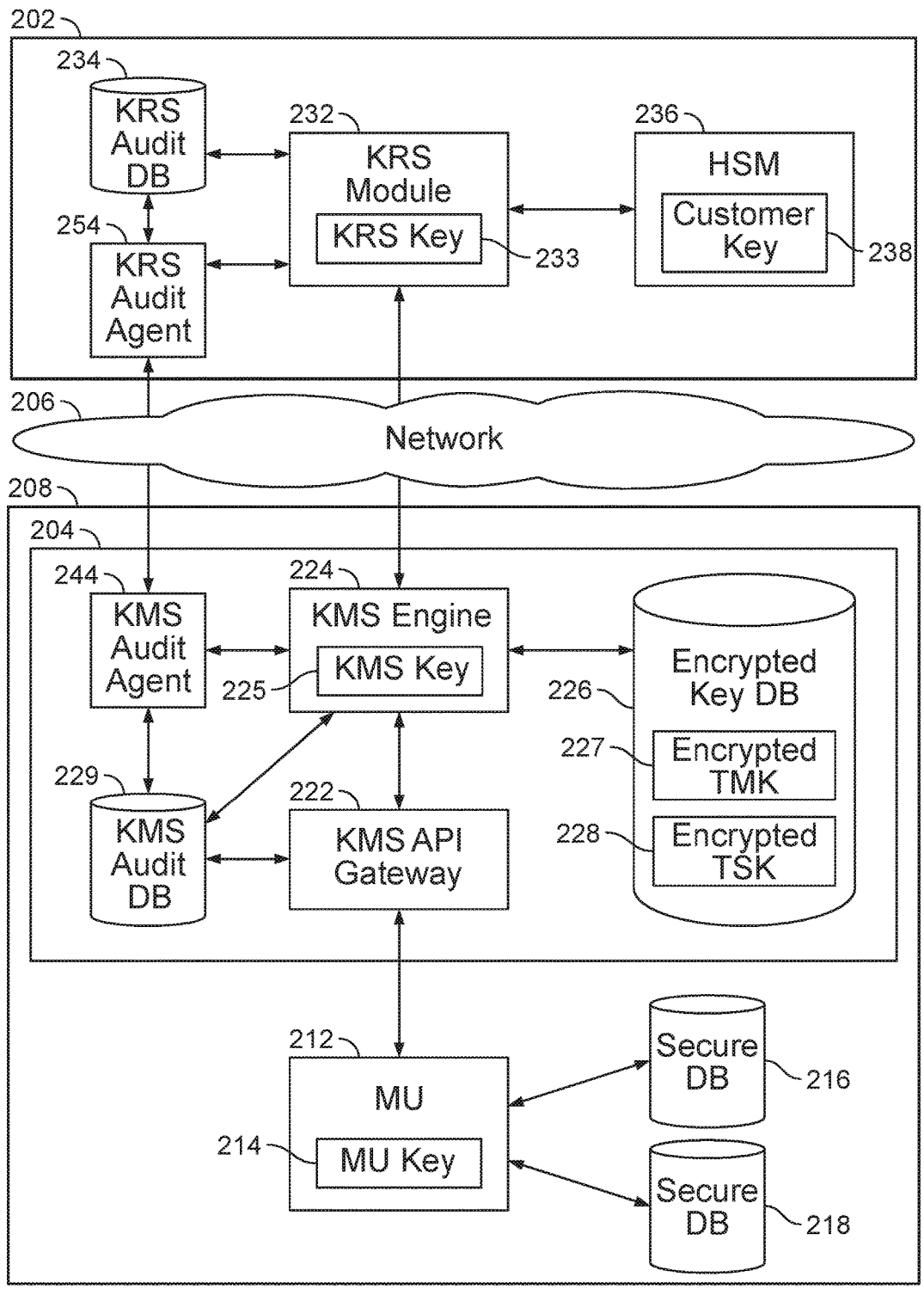
FIG. 2A is a block diagram illustrating an embodiment of a secure storage system.

FIG. 2A is a block diagram illustrating an embodiment of a secure storage system. In the example shown, key release system 202 is connected to key management system 204 via network 206. In some embodiments, key release system 202 comprises key release system 102 of FIG. 1; key management system 204 comprises key management system 104 of FIG. 1; and network 206 comprises network 106 of FIG. 1. Key release system 202 comprises key release system module (KRS Module) 232, key release system audit database (KRS Audit DB) 234, hardware security module (HSM) 236, and key release system audit agent (KRS Audit Agent) 254. KRS Module 232 is connected to and can access KRS Audit DB 234 and HSM 236. KRS Module 232 is connected to KRS Audit Agent 254. HSM 236 comprises a customer key 238. In some embodiments, HSM 236 secures one or more customer keys. In some embodiments, HSM 236 and KRS Module 232 are hosted in different data centers. In some embodiments, KRS Module 232 is connected to one or more HSMs, each HSM comprising a customer key for each customer hosted on HSM 236. In some embodiments, KRS Module 232 comprises key release module key (KRS Key) 233. In some embodiments, KRS Key 233 comprises a public/private key pair.

In some embodiments, key management system 204 comprises key management system application programming interface gateway (KMS API Gateway) 222, key management system engine (KMS Engine) 224, encrypted key database (Encrypted Key DB) 226, key management system audit database (KMS Audit DB) 229, and key management system audit agent (KMS Audit Agent) 244. KMS Engine 224 is connected to KMS API Gateway 222, Encrypted Key DB 226, KMS Audit DB 229, and KMS Audit Agent 244. In some embodiments, functionality of KMS API Gateway 222 is incorporated into KMS Engine 224 and does not exist as a separate hardware component. In some embodiments, Encrypted Key DB 226 is a database that comprises encrypted keys used to access secure databases. In some embodiments, Encrypted Key DB 226 comprises encrypted tenant master key (Encrypted TMK) 227 and encrypted tenant service key (Encrypted TSK) 228. In various embodiments, the number of encrypted keys corresponds to the number of tenants (customers or clients to a database software company) and the number of services offered. KMS Audit DB 229 is a database that comprises contexts associated with key requests. In various embodiments, the contexts are audit records to track requests for tenant service keys used to access secure databases. For example, KMS Engine 224 can read and write to Encrypted Key DB 226 including reading and writing encrypted keys stored in Encrypted Key DB 226. Upon retrieval of an encrypted key, the encrypted key is decrypted using the technologies discussed herein. Once decrypted, the unencrypted key is used to decrypt the secure database. KMS Engine 224 can read and write to KMS Audit DB 229 including writing, updating, and retrieving logged contexts associated with key requests. In some embodiments, KMS Engine 224 comprises key management system key (KMS Key) 225. In some embodiments, KMS Key 225 is a public/private key pair.

In some embodiments, management utility (MU) 212 is connected to secure database (Secure DB) 216 and secure database (Secure DB) 218. In various embodiments, MU 212 is connected to multiple secure databases, each database securely storing data for one or more customers or tenants. MU 212 comprises management utility key (MU Key) 214. In some embodiments, MU Key 214 is a public/private key pair. Secure database 216 and secure database 218 can each store data encrypted with different tenant service keys different from MU Key 214. For example, MU 212 is connected to secure database 216 and secure database 218 but can not read or write data stored securely in the attached databases without first retrieving the appropriate encryption key from key management system 204. In various embodiments, MU 212 manages the lifecycle of software as a service applications and is accessed by an administrator user and/or customers.

In some embodiments, KRS Audit Agent 254 and KMS Audit Agent 244 are connected via Network 206. KRS Audit Agent 254 interfaces with KRS Audit DB 234 and KRS Module 232. KMS Audit Agent 244 interfaces with KMS Audit DB 229 and KMS Engine 224. In some embodiments, KRS Audit Agent 254 and KMS Audit Agent 244 perform key release audits described in more detail below.

Security Protocols

In the example of FIG. 2A, the system relies on secure communication protocols. In some embodiments, the connections that traverse Network 206, including connections between KRS Module 232 and KMS Engine 224 and between KRS Audit Agent 254 of key release system 202 and KMS Audit Agent 244 of key management system 204, use hypertext transfer protocol (HTTP) over transport layer security version 1.2 (TLS 1.2) over an internet protocol security (IPSec) virtual private network (VPN) or similar appropriate protocols. In some embodiments, connections between a key release system module and Hardware Security Modules, including the connection between KRS Module 232 and HSM 236, use HTTP over Mutual TLS 1.2 or similar appropriate protocols.

In some embodiments, connections to a database rely on a secure database connection protocol. In some embodiments, the connections between KRS Module 232 and KRS Audit DB 234; between KMS Engine 224 and KMS Audit DB 229; between KMS Engine 224 and Encrypted Key DB 226; between MU 212 and Secure DB 216; and between MU 212 and Secure DB 218 use Java™ database connectivity (JDBC) over TLS 1.2 or similar appropriate protocols. In some embodiments, read-only connections to a database are enforced by providing database credentials that allow only read-only access. In some embodiments, the connections between KMS API Gateway 222 and KMS Audit DB 229; between KMS Audit Agent 244 of key management system 204 and KMS Audit DB 229; and between KRS Audit Agent 254 of key release system 202 and KRS Audit DB 234 are read only and use JDBC over TLS 1.2 or similar appropriate protocols.

In some embodiments, connections between two networked components within the same datacenter, including the connection between KRS Module 232 and KRS Audit Agent 234 of key release system 202; between KMS Engine 224 and KMS Audit Agent 244 of key management system 204, between KMS Engine 224 and KMS API Gateway 222; and between KMS API Gateway 222 and MU 212, use HTTP over TLS 1.2 or similar appropriate protocols. In some embodiments, the connection between KMS Engine 224 and the user or administrator of MU 212 uses secure/multipurpose internet mail extensions (S/MIME) or similar appropriate protocols.

In some embodiments, key release system 202 and key management system 204 each exist in network isolation via a software or hardware firewall. In some embodiments, key release system 202 exists in the customer datacenter. In some embodiments, datacenter boundary 208 defines the boundary of the datacenter for software as a service provider—For example, key management system 204, MU 212, Secure DB 216, and Secure DB 218 reside within the datacenter of the software as a service provider.

Figure 2B:
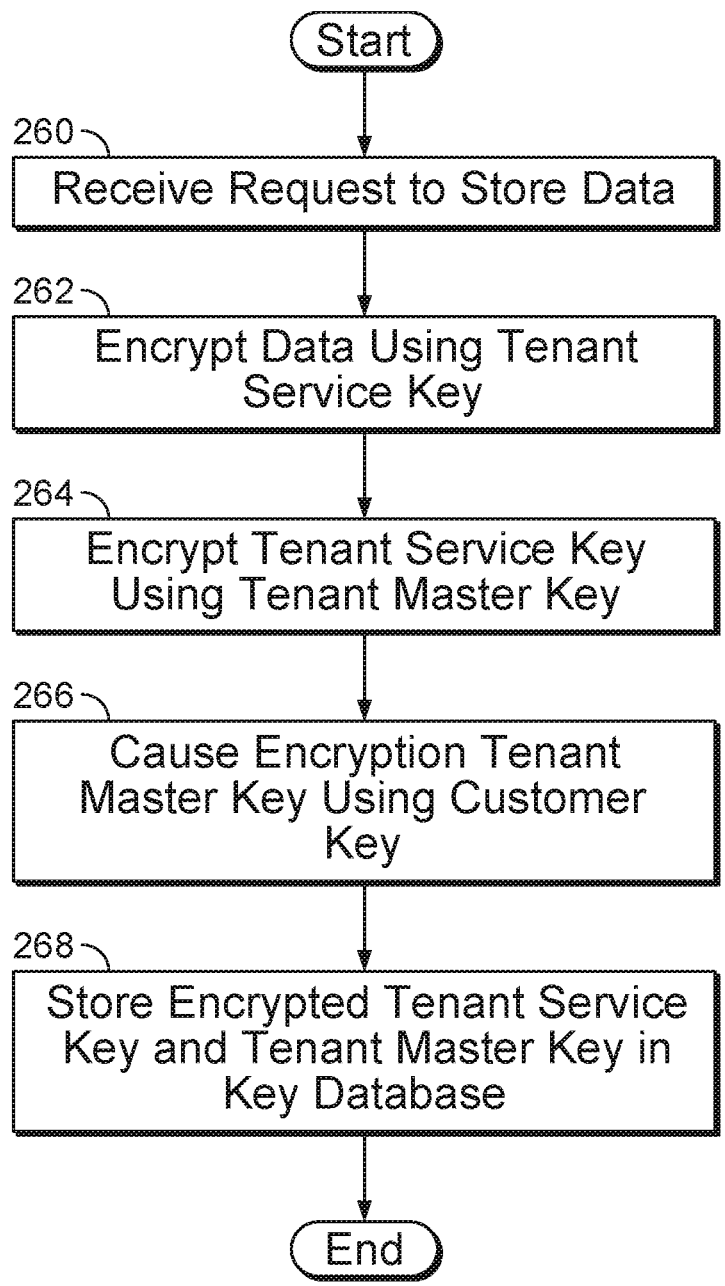
FIG. 2B is a flow diagram illustrating an embodiment of a process for storing data securely.

FIG. 2B is a flow diagram illustrating an embodiment of a process for storing data securely. In some embodiments, the process of FIG. 2B is implemented using key release system 102 and key management system 104 of FIG. 1. In the example shown, in 260 a request is received to store data. In 262, the data is encrypted using a tenant service key. For example, a tenant service key is generated (e.g., randomly, using entropy from an HSM, using a hash function of the data, or any other appropriate key generation technique) and used to encrypt the data for secure storage. In some embodiments, a MU encrypts the data using a tenant service key generated by a KMS system. In some embodiments, the KMS system provides the tenant service key to the MU using a public private key encryption and decryption. In some embodiments, the data is stored in a secure database. In 264, the tenant service key is encrypted using a tenant master key. For example, a tenant master key is generated (e.g., randomly, using a hash function of the tenant service key, or any other appropriate key generation technique) and used to encrypt the tenant service key for secure storage. In some embodiments, a request to the KMS is received to encrypt and store data securely with the tenant service key. In some embodiments, the KMS encrypts the tenant service key using a tenant master key. In 266, the tenant master key is caused to be encrypted using a customer key. For example, there is a pre-generation step in which a customer creates a customer key inside a hardware security module, and the customer key is referenced using a customer key ID. In some embodiments, the creation of a new tenant master key and the first request to encrypt it causes the customer KRS to pick a customer key ID/customer key to use, and then tells the KMS which customer key ID it used to encrypt the tenant master key. In some embodiments, a customer key is generated (e.g., randomly, using a lookup table, or any other appropriate key generation technique by a KMS system) and used to encrypt the tenant master key for secure storage. In some embodiments, the customer key is requested from a KRS system. In some embodiments, the KRS key is received by a KMS system and used to encrypt the tenant master key. In some embodiments, the KRS system communicates with the KMS system using public/private key communications. In some embodiments, the KMS system and the KRS system are physically remote from each other. In 268, the encrypted tenant service key and the encrypted tenant master key are stored in a key database. In some embodiments, the encrypted tenant master key storage location and the encrypted tenant service key storage location are logged in an audit database associated with the encrypted data storage location. In some embodiments, the customer key is stored in a hardware security module. In some embodiments, the hardware security module is located remotely from the key database in a KRS system. In some embodiments, the customer key location or identifier is logged in an audit database associated with the stored encrypted data storage location. In some embodiments, the tenant master key, the tenant service key, and the customer key or their identifiers are logged as well as their locations. Symmetric encryption keys are generated inside the customer HSM 236, possibly prior to the secure data storage request, tenant master keys or tenant service keys generation. Keys are assigned identifiers that are stored in both the customer HSM 236 and the encrypted key DB 226. The Customer encryption keys never leave the customer HSM, but the identifiers are passed along with requests to indicate which key shall be used in performing an encrypt or decrypt operation.

Figure 2C:
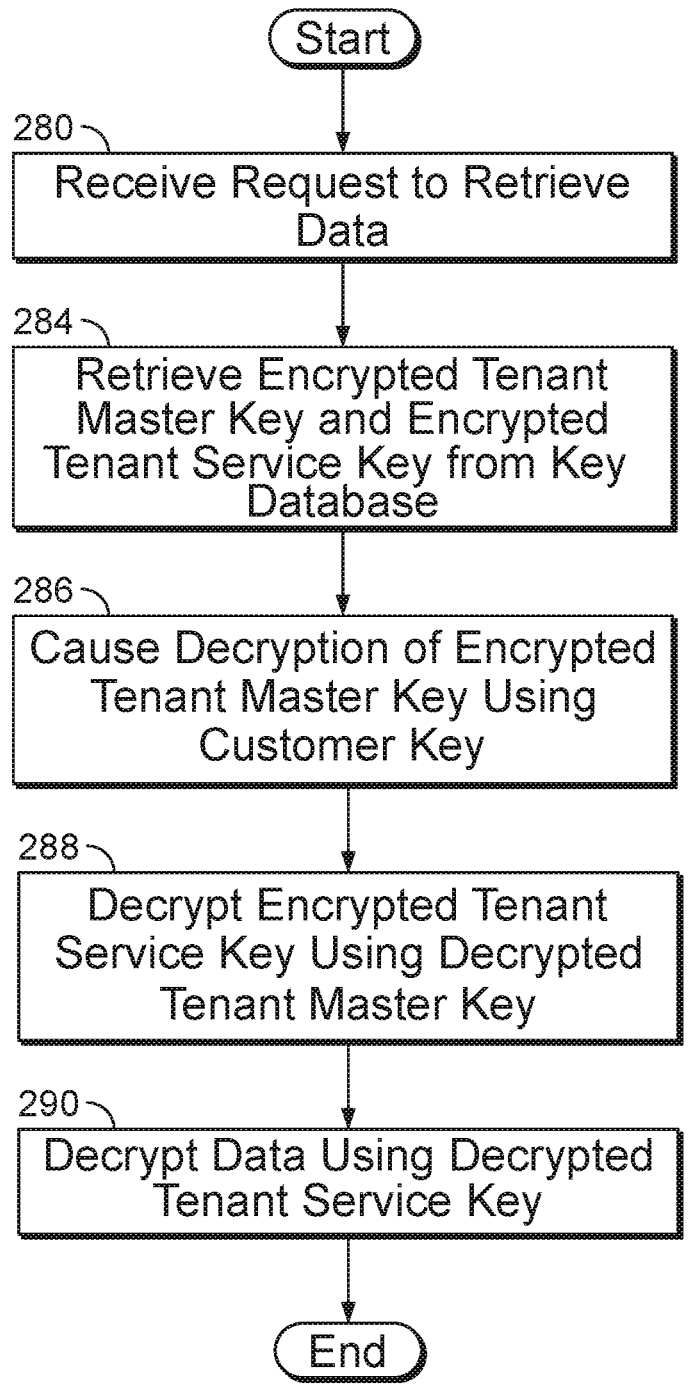
FIG. 2C is a flow diagram illustrating an embodiment of a process for retrieving stored data securely.

FIG. 2C is a flow diagram illustrating an embodiment of a process for retrieving stored data securely. In some embodiments, the process of FIG. 2C is implemented using key release system 102 and key management system 104 of FIG. 1. In the example shown, in 280 a request is received to retrieve data. In 284, an encrypted tenant master key and an encrypted tenant service key are retrieved from a key database. For example, an encrypted tenant master key and an encrypted tenant service key are retrieved from a key database based at least in part on data requested to be retrieved. In some embodiments, the key database is part of a KMS system. A customer master key is determined based at least in part on the data requested to be retrieved, e.g. the Tenant Master Key needed to perform the decryption. In some embodiments, the hardware security module is located remotely in a KRS system not physically local to a KMS system. In 286, the encrypted tenant master key is caused to be decrypted using a customer key. For example, the encrypted tenant master key is caused to be decrypted using a customer key by sending a request to a Customer HSM to perform decryption of the tenant master key. In some embodiments, an encrypted tenant master key is decrypted after being retrieved from the key database sent encrypted to the customer HSM and then returned in a decrypted format. In 288, an encrypted tenant service key is decrypted using the decrypted tenant master key. In 290, the data is decrypted using the decrypted tenant service key. In some embodiments, the data decryption is logged in an audit database including the location of the tenant master key, the tenant service key, and the customer key used for the data decryption. In some embodiments, the tenant master key, the tenant service key, and the customer key are logged as well as the locations.

Figure 3A:
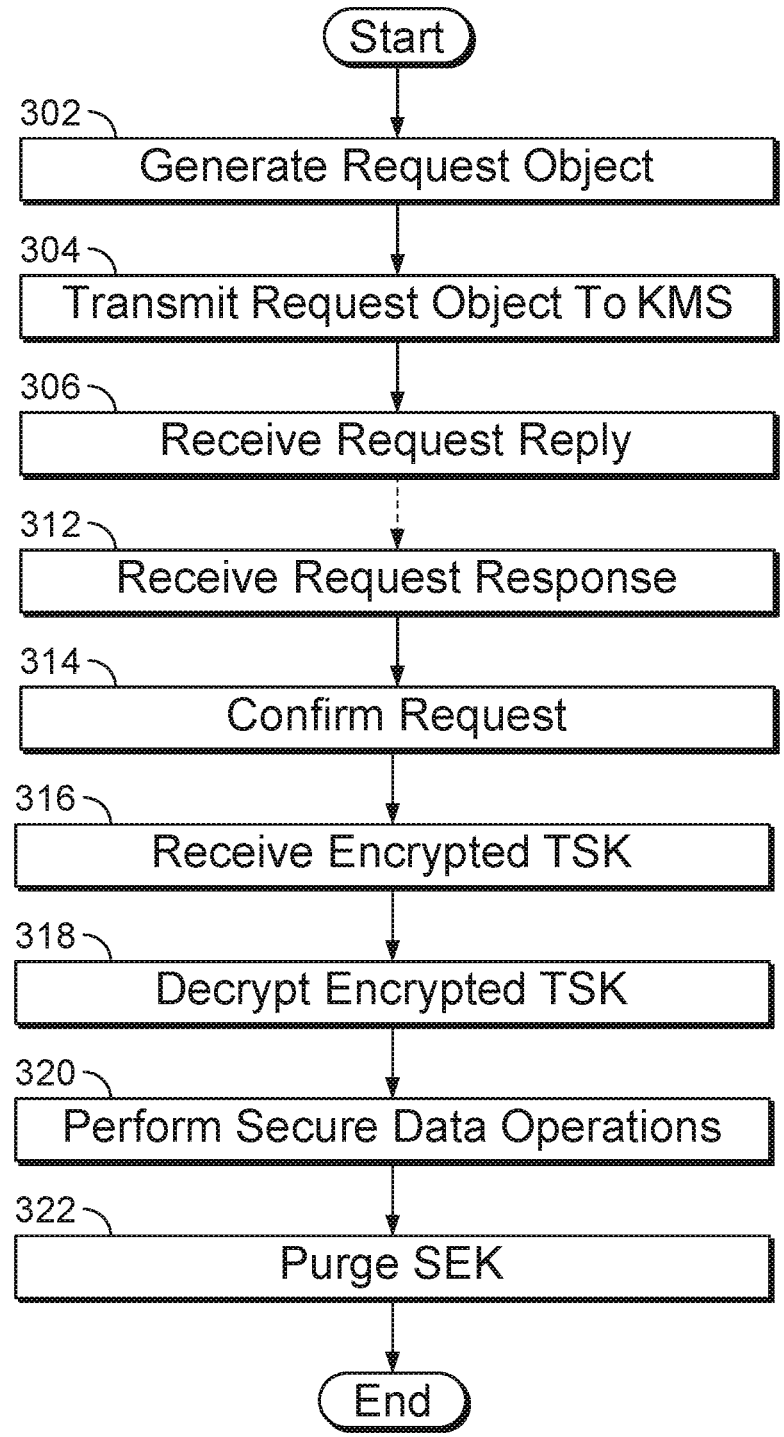
FIG. 3A is a flow diagram illustrating an embodiment of a process for securely storing data.

FIG. 3A is a flow diagram illustrating an embodiment of a process for securely storing data. In some embodiments, the process of FIG. 3A is performed by a management utility (MU) to request the release of a tenant service key to access encrypted data. In some embodiments, the process of FIG. 3A is used by MU 212 of FIG. 2A. In the example shown, in 302 a MU generates a request object that indicates the nature of the tenant service key request. For example, the request object can comprise a request for a tenant service key and an optional request service type. In some embodiments, the request object comprises an x5c JavaScript™ object notation (JSON) Web Token (JWT) signed with the private key of the MU. In some embodiments, the request object comprises a certificate with a public key that is used for later processing. In some embodiments, the private key is the private key of MU Key 214 of FIG. 2A and the certificate is the certificate associated with MU Key 214 of FIG. 2A. In 304, the MU transmits a request object to the key management system. In some embodiments, the request object can be verified by examining the request object signature using a corresponding public key. In various embodiments, the signature is of the x5c JWT. In some embodiments, the key management system is key management system 104 of FIG. 1. In some embodiments, the key management system is key management system 204 of FIG. 2A. In some embodiments, the MU communicates to the key management system via an application programming interface gateway such as KMS API Gateway 222 of FIG. 2A.

In 306, the MU receives a request reply from the key management system. In some embodiments, the request reply is a confirmation that the key management system received the request object. In some embodiments, the request reply comprises a unique identifier associated with the request object. As one example, a unique identifier is a hash of the request context for the tenant service key request and is generated by the key management system. In some embodiments, step 306 is not performed and the process proceeds from 304 to 312.

In 312, a request response is received. In some embodiments, the request response is received by the MU. In some embodiments, the request response is received by the user or administrator operating the MU. The request response indicates that the service request is ready to be completed. The request response includes a unique identifier associated with the specific request. In some embodiments, the unique identifier is received with the request reply in 306. As one example, a unique identifier is a hash of the request context. In some embodiments, the request response is received by the user or administrator of the MU via an email. In some embodiments, the request response is signed using an encryption key. As one example, the request response is signed using the private key associated with the key management system and can be verified using the corresponding public key. In some embodiments, the private key used to sign the request response is the private key of KMS Key 225 of FIG. 2A. In some embodiments, the transition from 306 to 312 is asynchronous, meaning that the calling system does not wait for 306 to complete, but instead holds a reference from 306 to check back later on the status of the operation and is represented by the dotted line in FIG. 3A. In some embodiments, the process is blocked after 306 pending approval for the release of the requested tenant service key.

In 314, the MU confirms the key request to the key management system. In some embodiments, the confirmation comprises presenting the unique identifier associated with the request object to the key management system. In various embodiments, the request is confirmed by transmitting to the key management system a new JWT signed using the private key of the MU. In some embodiments, the request confirmation is sent to the key management system via an application programming interface gateway of the key management system.

In 316, the MU receives the encrypted tenant service key from the key management system. In some embodiments, the tenant service key is decrypted using a decrypted tenant management key. In some embodiments, the tenant management key is decrypted using a customer key that is released using a key release system. In some embodiment, the customer key is cached for a session to enable decryption of a tenant management key for that session. In some embodiments, a tenant master key is cached for a session to enable decryption of a tenant service key for that session. In some embodiments, the encrypted tenant service key is encrypted using the public key of the MU. In some embodiments, the public key of the MU is the public key of MU Key 214 of FIG. 2A and included in the request object transmitted in 304. In 318, the MU decrypts the encrypted tenant service key into an unencrypted tenant service key. In some embodiments, the decryption relies on a corresponding private key such as the private key of MU Key 214 of FIG. 2A. Using the unencrypted tenant service key, in 320, the MU performs secure data operations on a secure data storage. For example, the MU can perform read operations from the secure data storage by decrypting data stored on the secure data storage that is encrypted with the tenant service key. As another example, the MU can perform write operations to the secure data storage by encrypting the data using the tenant service key when writing to the secure data storage. In various embodiments, the secure data storage is a database. In some embodiments, the encrypted data is stored in one or more secure databases such as Secure DB 216 and Secure DB 218 of FIG. 2A. In some embodiments, the secure data storage is a hard drive, SSD, file cluster, or other appropriate storage medium.

In 322, the MU purges the unencrypted tenant service key. As an example, purging is accomplished by removing the unencrypted tenant service key from memory. In some embodiments, the memory is overwritten with data to increase the difficulty of recovering the unencrypted tenant service key from memory. In some embodiments, the purging takes place based on a policy setting. For example, the policy setting can include an expiration time that indicates when the unencrypted tenant service key must be purged. Once the unencrypted tenant service key is purged, the MU can no longer perform data operations on the secure data storage without initiating a new request for the appropriate tenant service key.

FIG. 3B is a diagram illustrating an embodiment of a request object. In some embodiments, the request object of FIG. 3B is the request object generated and transmitted in FIG. 3A and used to request a key release. In the example, a request object comprises client certificate 350, information context of the request, and a client signature. In some embodiments, Client Certificate 350 is encoded in base 64 and is the certificate corresponding to MU Key 214 of FIG. 2A. In some embodiments, signature 357 is computed using the private key corresponding to client certificate 350. In some embodiments, signature 357 is computed over the header and the base 64 encoding of the body of the message. In some embodiments, the private key used for signature 357 corresponds to the private key of MU Key 214 of FIG. 2A.

In some embodiments, the information context of the request comprises fields Requested Key ID 351, Customer ID 352, Request Time 353, Request Nonce 354, Operation Context 355, and Operator Comment 356. In some embodiments, the information context contains an identifier for the key requested (e.g., Requested Key ID 351), a customer identifier (e.g., Customer ID 352), the time of the request (e.g., Request Time 353), a request nonce for the request (e.g., Request Nonce 354), detailed operational context in the form of key/value pairs (e.g., Operation Context 355), and an operator comment (e.g., Operator Comment 356). In some embodiments, the inclusion of suitably random Request Nonce 354 ensures that messages cannot be replayed to initiate a key release more than once. The key release system (KRS) keeps a cache of all recently used nonces. In some embodiments, the KRS comprises KRS 202 of FIG. 2A or KRS 102 of FIG. 1. When a new request object message is received, the local nonce cache is checked so see if an entry exists already, and if so, the message is rejected. If the KRS does not already track the nonce, it is recorded in the cache upon processing the request message. Nonces are purged from the KRS nonce cache after the validity period of the JWT used to secure the request object expires.

In some embodiments, operation context 355 comprises key/value pairs associated with an operation key, an environment key, an affected tenants key, and any other additional appropriate key. In some embodiments, the operation value associated with the operation key describes the purpose of the operation (e.g., to make a copy of the tenant, to migrate the tenant, etc.); the environment value associated with the environment key describes the operation environment, which is comprised of a data center and designation of production or non-production labels to indicate the type of data and workloads executed in those tenants; and the affected tenants value associated with the affected tenants key is an array of tenants impacted by the operation.

Figure 4:
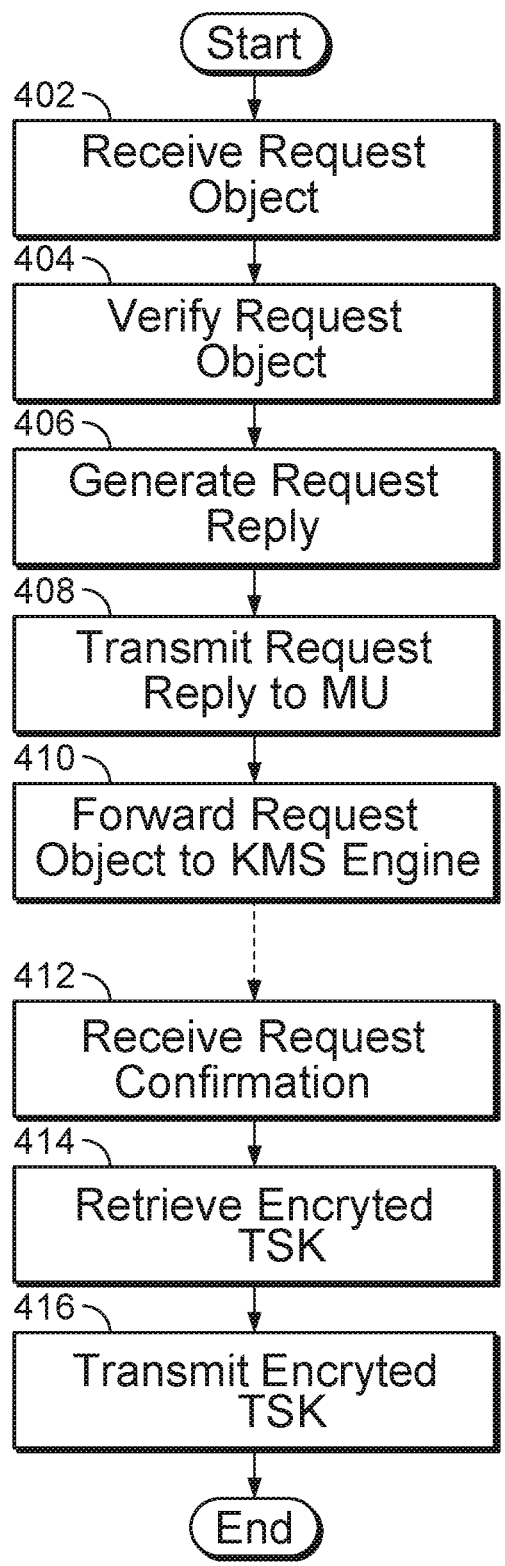
FIG. 4 is a flow diagram illustrating an embodiment of a process for securely storing data.

FIG. 4 is a flow diagram illustrating an embodiment of a process for securely storing data. In some embodiments, the process of FIG. 4 is performed by a key management system (KMS) in response to a request object from a management utility (MU) for the release of a tenant service key. In some embodiments, the process of FIG. 4 is used by key management system 104 of FIG. 1 or key management system 204 of FIG. 2A. In some embodiments, the key management system includes an application programming interface gateway and the process of FIG. 4 is performed using the KMS application programming interface gateway (KMS API Gateway) such as KMS API Gateway 222 of FIG. 2A. In some embodiments, partitioning the functionality of FIG. 4 into an application programming interface gateway separate from other key management system functionality limits the security risk to the key management system. In some embodiments, the MU is MU 212 of FIG. 2A.

In the example shown, in 402 a KMS API Gateway receives a request object that indicates the nature of the tenant service key request. In some embodiments, the request object is transmitted to the KMS API Gateway from 304 of FIG. 3A. In 404, the KMS API Gateway verifies the request object. In some embodiments, the KMS API Gateway verifies the request object by verifying the signature of the request object. As one example, the KMS API Gateway verifies the signature of the x5c JSON Web Token of the request object. In some embodiments, the verification uses a public certificate included with the request object. In some embodiments, the public certificate is Client Certificate 350 of FIG. 3B.

In 406, KMS API Gateway generates a request reply in response to the request object. In some embodiments, the request reply includes a unique identifier associated with the request object. As one example, the unique identifier is a hash of the request context for the tenant service key request. In various embodiments, the unique identifier is used to reference a particular request object for a tenant service key. The use of a unique identifier allows the key management system to process multiple requests concurrently. Requests can originate from one or more different management units for different customers, tenants, and services. In 408, the request reply generated in 406 is transmitted to the sender of the request object in 402. In some embodiments, the request reply is transmitted to the management utility. In some embodiments the management utility is MU 212 of FIG. 2A.

In 410, the request object received in 402 is forwarded to a key management system engine (KMS Engine). At this stage the key release request has been verified and given a unique identifier before being forwarded to the KMS Engine. In some embodiments, KMS Engine comprises KMS Engine 224 of FIG. 2A. KMS API Gateway forwards the request object to the KMS Engine to provide the KMS Engine context for the requested release of a tenant service key. In 412, KMS API Gateway receives a request confirmation corresponding to the request object from a management utility. In some embodiments, the request confirmation is initiated because the management utility receives an out-of-band notification that the key release has been authorized. The request confirmation initiates the retrieval of the released key. In some embodiments, the transition from 410 to 412 is asynchronous and represented by the dotted line in FIG. 4. In some embodiments, the request confirmation includes a unique identifier generated in 406 that corresponds to the request object received in 402. The unique identifier is used to identify a particular request for a tenant service key. As one example, the unique identifier is a hash of the request context for the tenant service key request and uniquely identifies a request. In some embodiments, the request confirmation comprises a new JWT. In some embodiments, the request confirmation is signed with a private key and verified using the corresponding public key and/or certificate. In various embodiments, the certificate included in the request object is used to verify the request confirmation.

In 414, KMS API Gateway retrieves an encrypted tenant service key (Encrypted TSK). In some embodiments, the Encrypted TSK is stored in an audit database. In some embodiments, the audit database comprises KMS Audit DB 229 of FIG. 2A. In some embodiments, the Encrypted TSK is encrypted using a public key and can only be decrypted using the corresponding private key. In various embodiments, the public/private key is the public/private key associated with MU Key 214 of FIG. 2A. In some embodiments, the public key is the public key of the certificate included with the request object received in 402.

In some embodiments, once the Encrypted TSK is retrieved from its storage location, the Encrypted TSK is permanently removed from that location. As one example, after retrieving Encrypted TSK from KMS Audit DB, the Encrypted TSK is removed from KMS Audit DB. In some embodiments, KMS API Gateway messages KMS Engine to remove the record of the Encrypted TSK from KMS Audit DB. In some embodiments, the timing of when the record of the Encrypted TSK is removed is based on a policy setting. Once the Encrypted TSK and corresponding record expires a new key release request must be initiated.

In 416, KMS API Gateway transmits the retrieved Encrypted TSK to the MU. The Encrypted TSK comprises an encrypted version of the requested tenant service key requested by MU in the request object in block 402. In various embodiments, the tenant service key always exists in an encrypted format when passing through KMS API Gateway and can only be decrypted using a private key accessible by the MU.

Figure 5A:
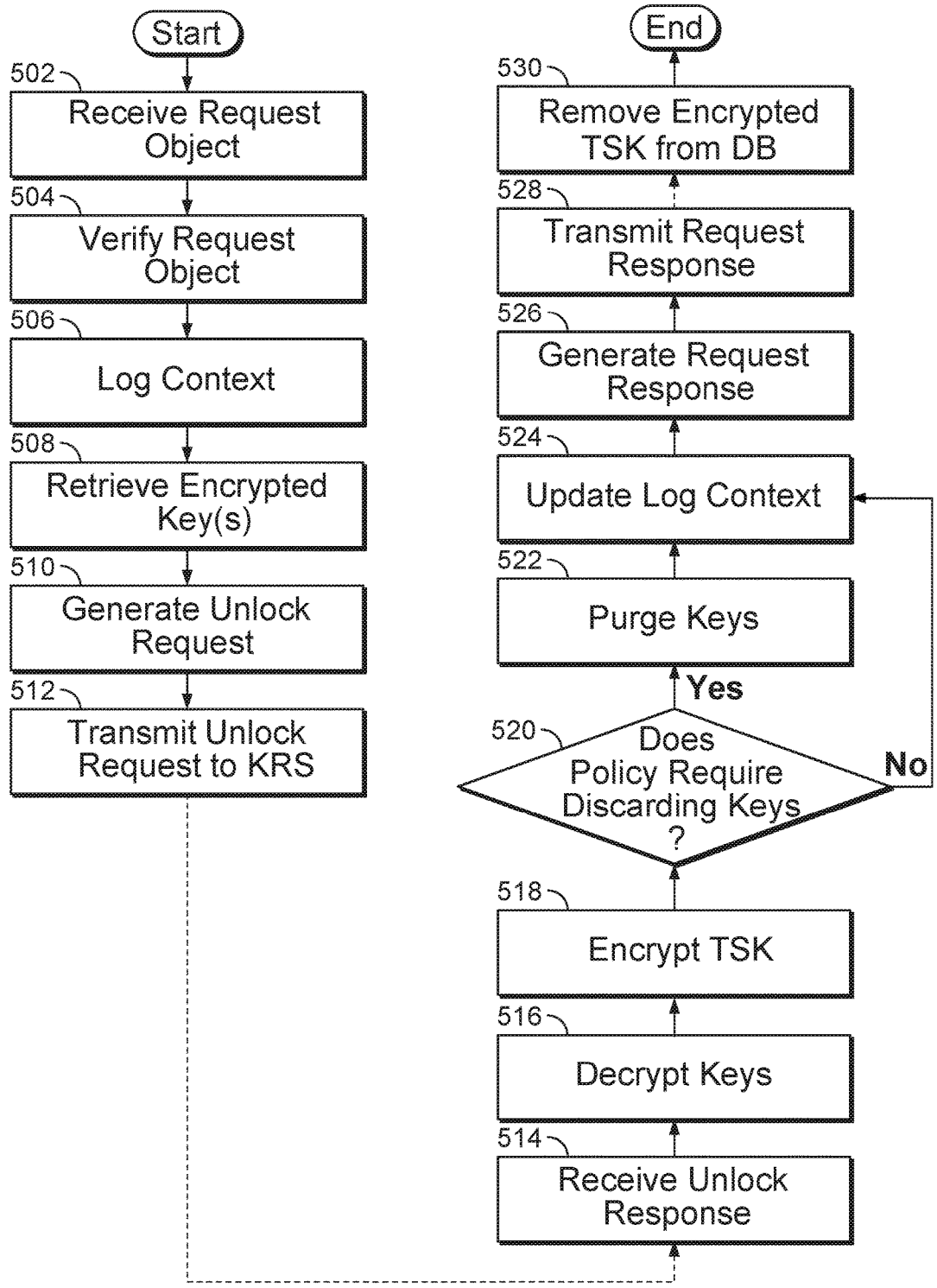
FIG. 5A is a flow diagram illustrating an embodiment of a process for securely storing data.

FIG. 5A is a flow diagram illustrating an embodiment of a process for securely storing data. In some embodiments, the process of FIG. 5A is performed by a key management system (KMS) in response to an initial request object from a management utility (MU) for the release of a tenant service key. In some embodiments, the process of FIG. 5A is used by key management system 104 of FIG. 1 or key management system 204 of FIG. 2A. In some embodiments, the key management system includes a key management system engine (KMS Engine) and the process of FIG. 4 is performed by the KMS Engine, such as KMS Engine 224 of FIG. 2A, in response to the forwarding of a request object by a KMS API Gateway. In some embodiments, the MU comprises MU 212 of FIG. 2A.

In the example shown, in 502 a KMS Engine receives a request object that indicates the nature of the tenant service key request. In some embodiments, the request object is transmitted from a KMS API Gateway to the KMS Engine as described with respect to 410 of FIG. 4. In some embodiments, KMS API Gateway comprises KMS API Gateway 222 of FIG. 2A. In 504, the KMS Engine verifies the request object. In some embodiments, the KMS Engine verifies the request object by verifying the signature of the request object. For example, the KMS Engine verifies the signature of the x5c JWT of the request object. In some embodiments, the verification uses a public certificate included with the request object.

In 506, the KMS Engine logs the context associated with the request object. In some embodiments, the KMS Engine logs the context to a key management system audit database (KMS Audit DB). In some embodiments the KMS Audit DB comprises KMS Audit DB 229 of FIG. 2A and the context is stored as a database record. In some embodiments, the context logged is information associated with key usage and/or key authorization of the requested tenant service key. In some embodiments, the KMS Audit DB is a durable queue indicating that the process of requesting a particular key has started. In some embodiments, the stored context comprises a client identifier, a client certificate, an identifier for the requested key, the type of encryption used, the service associated with the request, the time interval for the release, the use scenario for the release, a unique identifier associated with the request generated in 406 of FIG. 4, and any other appropriate data.

In 508, the KMS Engine retrieves an encrypted tenant service key and an encrypted tenant master key. The retrieved encrypted tenant service key comprises a version of the tenant service key requested by the request object encrypted using a tenant master key. The encrypted tenant master key is an encrypted version of the key needed to decrypt the encrypted tenant service key. The encrypted tenant master key is encrypted using a customer key. The encrypted tenant master key must be first decrypted before it can be used to decrypt the encrypted tenant service key. In various embodiments, different sets of encrypted tenant service keys and encrypted tenant master keys exist for different customers, tenants, and services. In some embodiments, the two encrypted keys are retrieved from an encrypted key database such as Encrypted Key DB 226 of FIG. 2A. In some embodiments, the retrieved encrypted tenant service key comprises Encrypted TSK 228 of FIG. 2A. In some embodiments, the retrieved encrypted tenant master key is Encrypted TMK 227 of FIG. 2A.

In some embodiments, the encrypted keys are cached by the KMS Engine. If the KMS Engine caching policy allows for caching, the KMS Engine will first check if a valid encryption key exists in the key cache of KMS Engine before retrieving an encrypted key from the encrypted key database. For example, in the event that a valid encrypted tenant master key exists in the key cache of the KMS Engine, the cached key is used and no encrypted tenant master key is retrieved from the encrypted key database. In some embodiments, the appropriate encrypted tenant master key is determined from the context of the request object. In various embodiments, the appropriate encrypted tenant master key is determined by metadata associated with the retrieved encrypted tenant service key.

In 510, the KMS Engine generates an unlock request for the encrypted tenant master key. In some embodiments, the unlock request comprises the encrypted tenant master key, the request object, and a request to decrypt the encrypted tenant master key. In some embodiments, the unlock request is signed using the private key associated with the key management system. In some embodiments, the unlock request further comprises a KMS certificate corresponding to the public key. In some embodiments, the private key associated with the key management system is the private key associated with KMS Key 225 of FIG. 2A. In some embodiments, if caching of the decrypted tenant master key is enabled, the KMS Engine generates an unlock request requesting key release authorization and transmits the request on the first request of a session; however, upon subsequent requests to decrypt a tenant master key during a session uses the cached decrypted tenant master key and does not generate or transmit the request to decrypt the tenant master key.

In 512, the KMS Engine transmits the unlock request to a key release system. In some embodiments, one or more different key release systems exist and are accessible to the KMS Engine. In some embodiments, the appropriate key release system is determined by the customer key used to encrypt the encrypted tenant master key. In various embodiments, different key release systems are associated with different customers. In some embodiments, the key release system is key release system 102 of FIG. 1 and key release system 202 of FIG. 2A. In some embodiments, the unlock message is transmitted from KMS Engine to a key release system module (KRS Module) of the key release system. In some embodiments, the KRS Module comprises KRS Module 232 of FIG. 2A. In various embodiments, the key release system and key management system are connected via a network such as Network 206 of FIG. 2A. In some embodiments, the communication in 512 relies on an IPSec VPN Tunnel. In some embodiments, the VPN tunnel uses TLS or another secure communication protocol technology.

In 514, the KMS Engine receives an unlock response from the key release system. The communication from key release system to KMS Engine occurs over a secure protocol. In some embodiments, the communication in 514 relies on an IPSec VPN Tunnel using TLS. In some embodiments, the unlock response comprises a second encrypted tenant master key and a context of the key release. In some embodiments, the second encrypted tenant master key is encrypted using the public key of the key management system. In some embodiments, the public key of the key management system comprises the public key of KMS Key 225 of FIG. 2A. In some embodiments, the unlock response is signed using a private key associated with the key release system and the authenticity of the unlock response can be verified by verifying the signature with the corresponding public key and/or certificate. In some embodiments, the private key associated with the key release system is the private key associated with KRS Key 233 of FIG. 2A. In some embodiments, the transition from 512 to 514 is asynchronous and represented by the dotted line in FIG. 5A.

In 516, the KMS Engine decrypts the second encrypted tenant master key and the encrypted tenant service key. In some embodiments, the second encrypted tenant master key is decrypted using the private key associated with the KMS Engine. In some embodiments, the private key associated with the KMS Engine is the private key of KMS Key 225 of FIG. 2A. The second encrypted tenant master key is decrypted into a second unencrypted tenant master key. The encrypted tenant service key is decrypted using the unencrypted tenant master key into an unencrypted tenant service key.

In 518, the KMS Engine encrypts the unencrypted tenant service key from 516 into a second encrypted tenant service key. In some embodiments, the second encrypted tenant service key is encrypted using the public key associated with the MU that requested the key release. In some embodiments, the public key comprises the public key associated with MU Key 214 of FIG. 2A. In some embodiments, the public key is provided and retained from the request object received in 502 via the public key in the certificate.

In 520, the KMS Engine determines whether the policy settings require discarding keys. In some embodiments, the policy settings are configured to discard one or more keys received in the unlock response in 514 and/or decrypted in 516. The keys stored in the KMS Engine available for discarding comprise a second encrypted tenant master key, an unencrypted tenant master key, and an unencrypted tenant service key. In the event that the policy settings require discarding the keys, in 522, the KMS Engine purges the appropriate keys. As one example, based on policy settings, the unencrypted tenant service key is immediately removed from memory. In some embodiments, the memory is overwritten with data to increase the difficulty of recovering the key from memory.

After the purging of keys is complete or in the event that the policy settings do not require discarding, in 524 the KMS Engine updates the context originally logged in 506. In some embodiments, the context is updated to include a key release authorization. In some embodiments, the context is updated to contain the second encrypted tenant service key from 518 and the customer response to the request object. As one example, the customer response is based on the unlock response received in 514 to the unlock request transmitted to the key release system in 512. In some embodiments, the context is stored in an audit or use record of the key management system audit database. In some embodiments the key management system audit database comprises KMS Audit DB 229 of FIG. 2A.

In 526, the KMS Engine generates a request response. The request response indicates the result of the request for a key release. The request response corresponds to the request in the request object received in 502. The request response comprises a unique identifier associated with the request object. As one example, the unique identifier is a hash of the request context for the service key request. In various embodiments, the unique identifier is used to reference a particular request object. In some embodiments, the request response is signed with the private key of the key management system and can be verified with the corresponding public key.

In 528, the KMS Engine transmits the request response to its intended recipient. In some embodiments, the intended recipient is a user or administrator of a management utility requesting the key release. In some embodiments, the request response is emailed to the user or administrator. In some embodiments, the intended recipient is a software component of the management utility requesting the release or a software agent for automated processing of the authorization. In other embodiments, the request response is delivered in an appropriate encoded message format such as base 64 encoding.

In 530, the KMS Engine removes the second encrypted tenant service key created in 518 from the KMS Audit DB. In some embodiments, the KMS Engine removes the record corresponding to the second encrypted tenant service key from the KMS Audit DB. In some embodiments, the record is only modified to remove a released key and not deleted. As one example, the record is modified by removing the second encrypted tenant service key from the record and updating it to indicate that the second encrypted tenant service key is no longer accessible. In some embodiments, 530 is triggered by a message from the KMS API Gateway in 414 of FIG. 4 once the second encrypted tenant service key is retrieved. In some embodiments, the transition from 528 to 530 is asynchronous. In FIG. 5A, the transition is represented by the dotted line to reflect the asynchronous nature.

FIG. 5B is a diagram illustrating an embodiment of an unlock request message. In some embodiments, the unlock request message is generated by a key management system and transmitted to a key release system in response to receiving a request object. In some embodiments, the unlock request message of FIG. 5B is the unlock request generated and transmitted in FIG. 5A. In some embodiments, the request object is described in FIG. 3B. In the example, an unlock request message comprises the key management system certificate, the context associated with the requested tenant master key, the request object message, and a key management system signature. In some embodiments, KMS Certificate 550 is encoded in base 64 and is the certificate corresponding to KMS Key 225 of FIG. 2A. In some embodiments, KMS Signature 563 is computed using the private key corresponding KMS Certificate 550. In some embodiments, KMS Signature 563 is a chain signature performed over the received request object message combined with a context from the key management system.

In some embodiments, the context associated with the requested tenant master key of the unlock request message comprises fields Tenant Master Key ID 552, Customer Key ID 553, Encrypted Tenant Master Key With Customer Key 554, and Initialization Vector 555. In some embodiments, the context contains a tenant master key identifier (e.g., Tenant Master Key ID 552), a customer key identifier (e.g., Customer Key ID 553), a tenant master key encrypted with the customer key (e.g., Encrypted Tenant Master Key With Customer Key 554), and an encryption initialization vector (e.g., Initialization Vector 555). In some embodiments, the fields Client Certificate 551, Requested Key ID 556, Customer ID 557, Request Time 558, Request Nonce 559, Operation Context 560, Operator Comment 561, and Client Signature 562 correspond to fields of the request object message described in FIG. 3B.

Figure 6A:
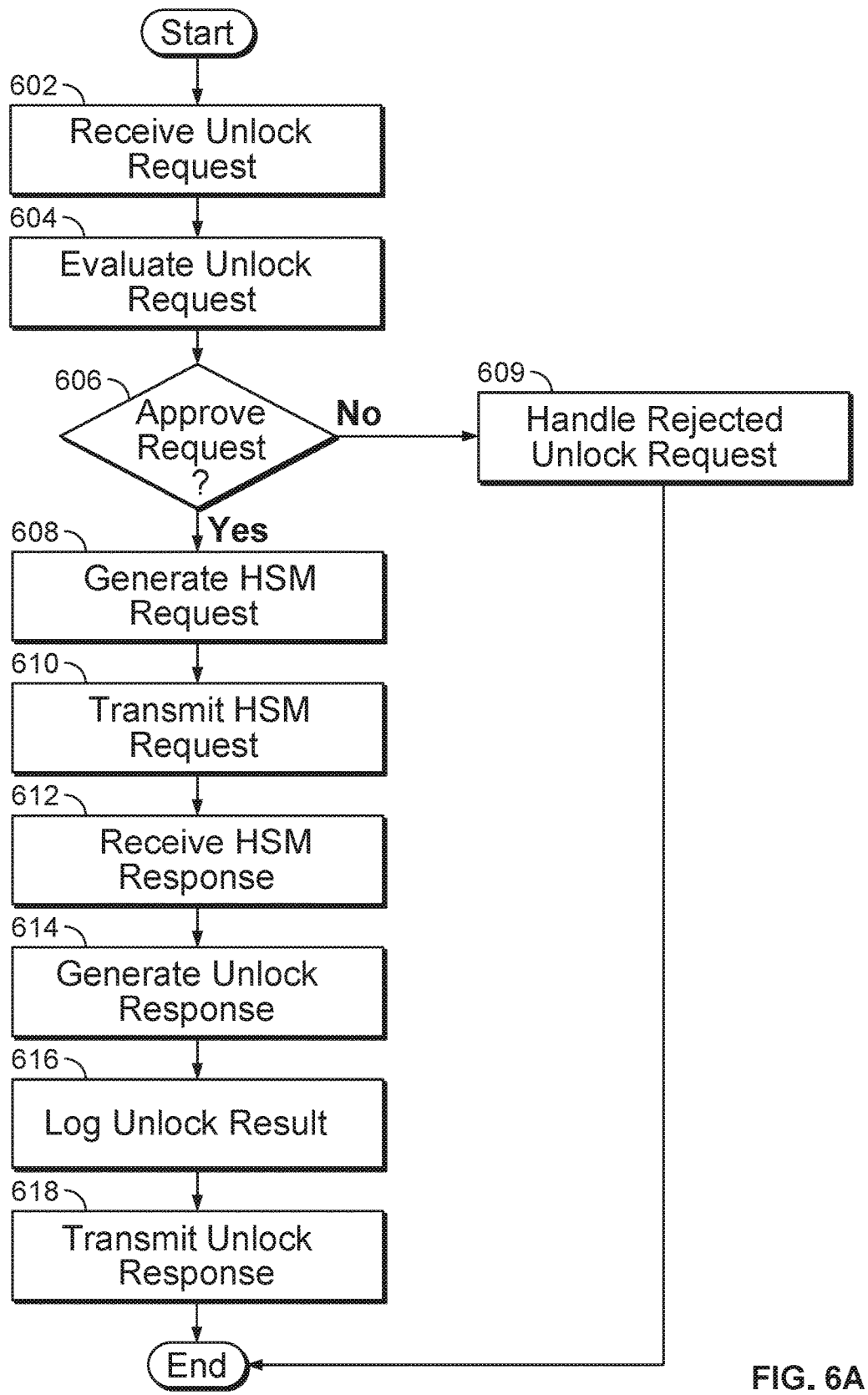
FIG. 6A is a flow diagram illustrating an embodiment of a process for securely storing data.

FIG. 6A is a flow diagram illustrating an embodiment of a process for securely storing data. In some embodiments, the process of FIG. 6A is performed by a key release system (KRS) in response to an unlock request from a key management system. In some embodiments, the process of FIG. 6A is performed by the key release system module (KRS Module) of the key release system. In some embodiments, the key release system is key release system 102 of FIG. 1. In some embodiments, the key release system is key release system 202 of FIG. 2A and KRS Module is KRS Module 232 of FIG. 2A.

In the example shown, in 602 the KRS Module receives an unlock request. In some embodiments, the unlock request is transmitted from a KMS Engine to the KRS Module from 512 of FIG. 5A. The unlock request provides context for the requested key release. In some embodiments, the unlock request comprises a signature that is verified to ensure the accuracy of the request. As described in additional detail in reference to 510 of FIG. 5A, in some embodiments, the unlock request comprises an encrypted tenant master key, a request object, and a request to decrypt the encrypted tenant master key. In some embodiments, the request object comprises the context for the release of the tenant master key.

In 604, the KRS Module evaluates the unlock request to determine whether or not to release the requested key based on the supplied context. In some embodiments, the request is evaluated by a human administrator. In some embodiments, the request is evaluated using a software agent, a rules engine, policy settings, or other appropriate means. In 606, it is determined whether to approve the release request. In the event the request is not approved, in 609, the KRS Module handles the rejected unlock request. In some embodiments, an unlock response rejecting the request is returned to the KMS Engine. In other embodiments, the rejection is logged in a database such as a KRS Audit Database. In various embodiments, the customer is notified that a request has been made and was rejected. As one example, the customer administrator receives an email notifying the administrator of all requests including all rejected requests.

In the event the unlock request is approved, in 608 the KRS Module generates a Hardware Security Module (HSM) request. The HSM request comprises a request to decrypt the encrypted tenant master key. In 610, the HSM request is transmitted to the appropriate Hardware Security Module (HSM). In some embodiments, the HSM is HSM 236 of FIG. 2A. In some embodiments, more than one redundant HSM exists. In some embodiments, one or more HSMs are partitioned based on the customer keys each HSM secures. In some embodiments, the HSM request is transmitted using a secure protocol. As an example, the KRS Module communicates to the HSM using TLS.

In 612, the KRS Module receives a HSM response. In some embodiments, the HSM response comprises an unencrypted tenant master key and is transmitted to the KRS Module from a HSM. In some embodiments, the HSM first authenticates the HSM request transmitted in 610. Once authenticated, the encrypted key in the HSM request is decrypted with the appropriate encryption key. In some embodiments, the encryption key is a customer key used to encrypt the encrypted tenant master key. In various embodiments, one property of the HSM is that the encryption key never leaves the HSM. In some embodiments, the customer key is customer key 238 of FIG. 2A. After the HSM uses the customer key to decrypt the encrypted key provided in the HSM request, the decrypted key is packaged in a HSM response, transmitted to the KRS Module, and received by the KRS Module in 612. In some embodiments, the customer key is a symmetric key and the same key is used to both encrypt and decrypt. As one example, the customer key is an AES-256 secret key generated by a secure source of entropy such as an HSM.

In 614, the KRS Module generates an unlock response. In some embodiments, the unlock response comprises a context associated with the unlock request. The context indicates that the KRS Module has released the tenant master key in response to the unlock request. In some embodiments, the unlock response further comprises a second encrypted tenant master key. The second encrypted tenant master key is the unencrypted tenant master key extracted from the HSM response of 612 encrypted with the public key of the key management system. In some embodiments, the unencrypted tenant master key is encrypted with the public key of KMS Key 225 of FIG. 2A. In various embodiments, the context is signed using a private key. In some embodiments, the private key is the private key of KRS Key 233 in FIG. 2A.

In some embodiments, the unencrypted tenant master key is purged from memory once the second encrypted tenant master key is created. In some embodiments, the memory is overwritten with data to increase the difficulty of recovering the unencrypted tenant master key from memory. In some embodiments, the purging takes place based on a policy setting and the KRS Module caches certain keys to minimize the number of HSM requests.

In 616, the KRS Module logs an unlock result. In some embodiments, the unlock result comprises a use and/or authorization record to audit key releases. In some embodiments, the unlock result comprises the context of the unlock request received in 602 and response generated in 614. The KRS Module logs the unlock result in a database such as a key release system audit database (KRS Audit DB). In some embodiments, KRS Audit DB is KRS Audit DB 234 of FIG. 2A. In various embodiments, the KRS Audit DB stores all access requests and results to key releases. In 618, the KRS Module transmits the unlock response to the KMS Engine. In some embodiments, this transmission is performed over a secure channel using a protocol such as TLS.

FIG. 6B is a diagram illustrating an embodiment of an unlock response message. In some embodiments, the unlock response message is generated by a key release system and transmitted to a key management system in response to receiving an unlock request message. In some embodiments, the unlock response message of FIG. 6B is the unlock response generated in 614 and transmitted in 618 of FIG. 6A. In some embodiments, the unlock request message is described in FIG. 5B. In the example, an unlock response message comprises a key release system certificate, the key request context, and a key release system signature. In some embodiments, the KRS Certificate 650 is encoded in base 64 and is the certificate corresponding to KRS Key 233 of FIG. 2A. In some embodiments, KRS Signature 659 is computed using the private key corresponding KRS Certificate 650. In some embodiments, KRS Signature 659 is computed using a private key over the header and the base 64 encoding of the body of the message. In some embodiments, the private key corresponds to the private key of KRS Key 233 of FIG. 2A.

In some embodiments, the key request context of the unlock response comprises the context for the key release and the released key. In some embodiments, the key request context comprises the fields Tenant Master Key ID 651, Encrypted Tenant Master Key With KMS Key 652, Customer ID 653, Response Time 654, In Response To Nonce 655, Response Nonce 656, In Response To Hash 657, and Authorized Key Hash 658. In some embodiments, the key request context contains a tenant master key identifier (e.g., Tenant Master Key ID 651), a tenant master key encrypted with the KMS public key (e.g., Encrypted Tenant Master Key With KMS Key 652), a customer identifier (e.g., Customer ID 653), a response time (e.g., Response Time 654), the nonce from the release request (e.g., In Response To Nonce 655), a newly generated response nonce (e.g., Response Nonce 656), a response to a hash (e.g., In Response To Hash 657), and an authorized key hash (e.g., Authorized Key Hash 658).

In some embodiments, Response Time 654 is a use window or an expiration time for the key release. For example, the message is treated as invalid when the current time is outside the response time. In some embodiments, Response Nonce 656 and In Response To Nonce 655 ensure that messages cannot be replayed either to or from the KRS System to initiate or respond to a given request more than once. In some embodiments, In Response To Hash 657 increases the certainty that the unlock response correlates in a 1:1 relationship to the original unlock request. In Response To Hash 657 increases the certainty that the message has not been tampered with. In some embodiments, Authorized Key Hash 658 prevents the key release from being combined with the use/release of another key. In some embodiments, the fields Tenant Master Key ID 651 and Customer ID 653 correspond to fields of the unlock request message described in FIG. 5B.

The techniques described in herein are used to securely store data. For example, a customer managing a tenant can use the techniques to clone and export a data repository that contains data protected by a tenant service key and customer key. The cloning and exporting operations require that a customer authorize the release of the customer key needed to access the tenant service key. The customer key is needed to decrypt a tenant master key. The tenant master key is needed to decrypt the tenant service key. The tenant service key is needed to decrypt the protected data. In some embodiments, the policy settings can be configured such that the KMS engine can enforce renewing a request for a key release for subsequent operations on a protected tenant even when the unencrypted key is internally cached inside the key management system. Each initial release and subsequent re-release of a customer key is logged and can be audited.

Automated Tenant Operations

In some embodiments, the key release functionality is automated. In some embodiments, the automation is accomplished by integrating a self-service ticketing system to find appropriate granted authorizations. In some embodiments, the self-service ticketing system is accessible over a network such as the Internet. In this scenario, the management utility makes a call to a self-service ticketing system prior to contacting the key management system. In some embodiments, the management utility generates a request context, which is signed with a private key, and transmits the request to the self-service ticketing system. In some embodiments, the management utility observes the state of a ticket system to determine what tenant operations have been previously requested before transmitting a similar request. In some embodiments, the request is performed by MU 212 of FIG. 2A.

In some embodiments, when configured with a self-service ticketing system, the key release system no longer requires a human administrator to evaluate an unlock request. In the scenario, KRS Module evaluates the unlock request to determine whether or not to release the requested key by verifying the state of the self-service ticket system to confirm the key has been authorized for release. In some embodiments, the evaluation is performed by KRS Module 232 of FIG. 2A by communicating over a network to a self-service ticketing system.

In some automated embodiments, once the key management system has updated the Audit database to reflect the release of the requested tenant service key, the KMS Engine transmits the encrypted tenant service key to the KMS API Gateway. The KMS API Gateway in turn transmits the encrypted tenant service key to the system requesting the key release (e.g., a management utility), where it is used to perform secure data operations. In some embodiments, the encrypted tenant service key is pushed to the management utility; the key is not stored in the KMS Audit database and not requested by the management utility via a confirmation request.

Auditing of Key Releases

Figure 7A:
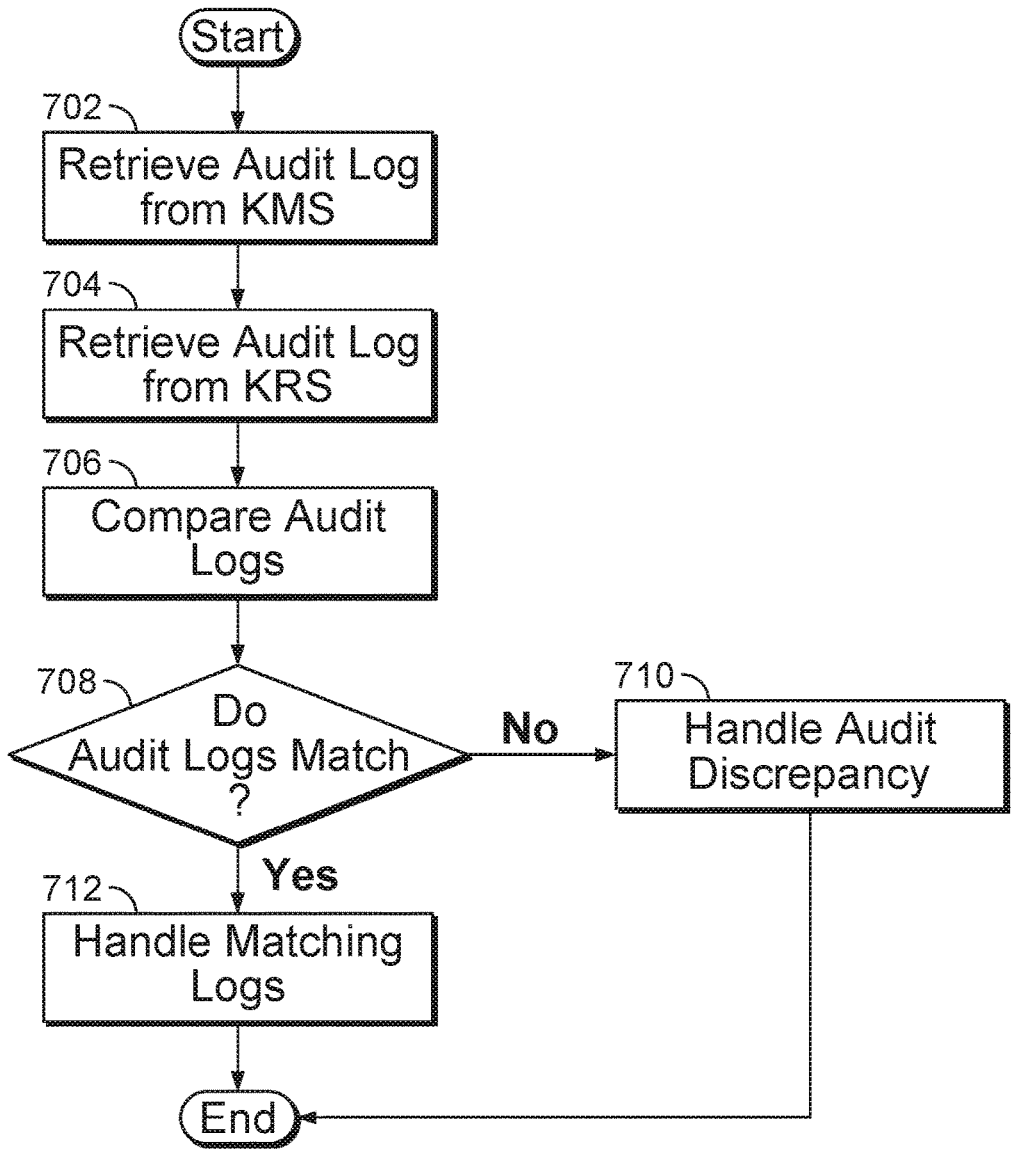
FIG. 7A is a flow diagram illustrating an embodiment of a process for auditing key releases.

FIG. 7A is a flow diagram illustrating an embodiment of a process for auditing key releases. In some embodiments, the process of FIG. 7A is performed by the system in FIG. 1 and the system in FIG. 2A. In the example shown, a key release system and a key management system both keep an audit log of key releases. In some embodiments, the audit logs are stored as key use/authorization audit records in audit databases. In some embodiments, the key release system audit database (KRS Audit DB) is KRS Audit DB 234 of FIG. 2A and the key management system audit database (KMS Audit DB) is KMS Audit DB 229 of FIG. 2A.

In the example shown, in 702, audit records corresponding to key releases are retrieved from the KMS Audit DB. In 704, audit records corresponding to key releases are retrieved from the KRS Audit DB. In 706, the audit records from the KMS Audit DB and KRS Audit DB are compared. Each authorized key release is logged in both the KMS Audit DB and the KRS Audit DB. In some embodiments all records are retrieved and compared. In some embodiments, only failed or only successful key releases are retrieved and compared. In some embodiments, the records are compared by determining if any records exist in one audit log but not the other. One example is the case that the records in the two audit databases are inconsistent and do not match. A record exists in one audit database indicating a completed key release but no matching record exists in the other database. In 708, it is determined whether the audit logs match and are consistent. In some embodiments, each compared field of the record must be identical to the corresponding field of the record in the other database for the audit logs to match.

In the event the logs do not match, in 710 the audit discrepancy is handled. In some embodiments, the discrepancy indicates a configuration problem, software bug, connectivity issue, or malicious event has caused the release of a key without both modules' full understanding. For example, a release record in the KRS Audit DB that is missing the KMS Audit DB warrants further investigation and can indicate that the customer released a key but that the key was not used by the software application requesting the key. In some embodiments, the discrepancy initiates a tamper evident kill switch for all processing. No further keys are released until the kill switch is disabled. In some embodiments, the discrepancy initiates sending a discrepancy audit message to the user or administrator of the secure storage system. In some embodiments, the discrepancy prompts the user or administrator with a warning to investigate the issue before additional processing continues.

In the event the two audit logs do match and are consistent, in 712 no discrepancy is found. In some embodiments, in 712 a successful audit message is sent to the user or administrator of the secure storage system.

In some embodiments, the audit process is run periodically, for example, hourly, daily, based on the frequency of key releases, or based on another appropriate metric. In some embodiments, the process is run after each key release by the key release system. In some embodiments, the process is run after each key release by the key management system. In some embodiments, the process is initiated by the management utility or the user or administrator of the management utility of the secure storage system. In some embodiments, the process of FIG. 7A is performed by one or more Audit Agents including a KMS Audit Agent and a KRS Audit Agent. In some embodiments, the key management system comprises a KMS Audit Agent. In some embodiments, the key release system comprises a KRS Audit Agent. In some embodiments, a KMS Audit Agent is a KMS Audit Agent 244 of FIG. 2A and KRS Audit Agent is KRS Audit Agent 254 of FIG. 2A.

FIG. 7B is table illustrating an embodiment of a release record. In some embodiments, the release record is a database record used to log the context associated with a release request and used for auditing key use and authorization. In some embodiments, the release record is generated as the context for a release. In some embodiments, the release record is logged in 506 and 524 of FIG. 5A as part of the log context. In some embodiments, the release record is logged in 616 of FIG. 6A as part of the unlock result. In some embodiments, the release records are retrieved in 702 and 704 and compared in 706 of FIG. 7A. In some embodiments, the release record are consistent with database schemas shown in FIG. 8B and FIG. 8C. In some embodiments, the release record corresponds to a record in table Key Usage 811 of FIG. 8B and/or a record in table Access Audit History 821 of FIG. 8C.

In the example shown, a release record comprises fields Request ID 722, Request Context Message Hash 724, Customer Authorization Message 726, and Customer Authorization Message Hash 728. Request ID 722 is a request identifier. Request Context Message Hash 724 is a hash of the request context. Customer Authorization Message 726 is a customer authorization message for a key release. Customer Authorization Message Hash 728 is a hash of the customer authorization message. In some embodiments, value for Request Context Message Hash 724 is generated in 406 of FIG. 4 as part of the request reply and acts as a confirmation of the receipt of a key release.

Figure 8A:
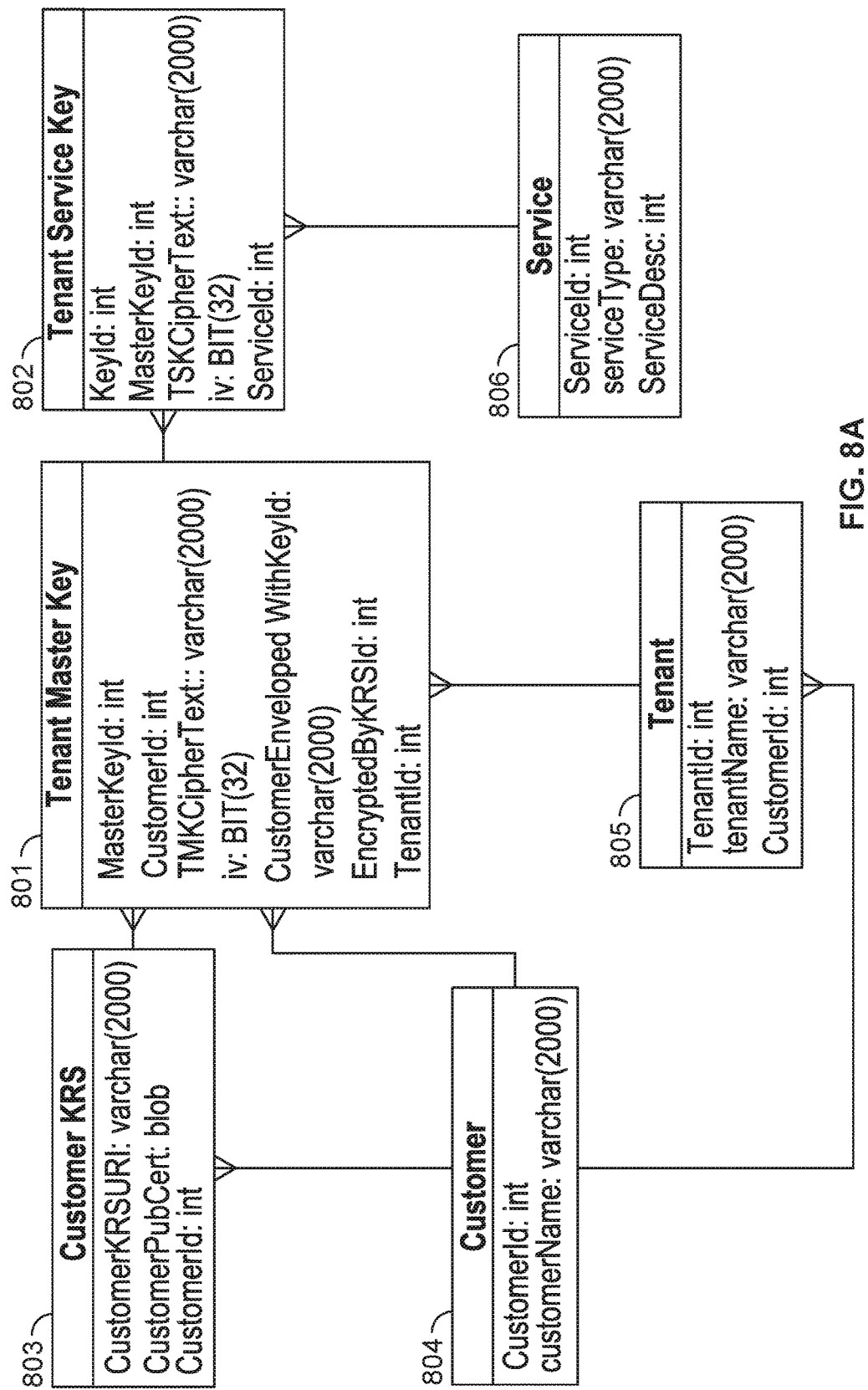
FIG. 8A is diagram illustrating an embodiment of a KMS Encrypted Key Database schema.

FIG. 8A is diagram illustrating an embodiment of a KMS Encrypted Key Database schema. In some embodiments, the schema of FIG. 8A is used for the encrypted key database of the key management system. In some embodiments, Encrypted Key DB 226 of FIG. 2A uses the schema of FIG. 8A. In the example, the KMS Encryption Key Database schema comprises tables Tenant Master Key 801, Tenant Service Key 802, Customer KRS 803, Customer 804, Tenant 805, and Service 806. The type of connection shown in FIG. 8A between tables 801, 802, 803, 804, 805, and 806 indicates the relationship between tables, for example, multiple lines merging into a single line indicates a many-to-one relationship. In some embodiments, the tables 801-806 will comprise additional fields as appropriate.

In some embodiments, each record of table Tenant Master Key 801 corresponds to an encrypted tenant master key for a customer. Each record contains an identifier for the tenant master key (e.g., MasterKeyId), a customer identifier (e.g., CustomerId), the encrypted tenant master key (e.g., TMKCipherText), an initialization vector (e.g., iv), a customer enveloped with key identifier (e.g., CustomerEnvelopedWithKeyId) indicating the id of the Customer Master Key used to encrypt the Tenant Master Key, an encrypted by KRS identifier (e.g., EncryptedByKRSId) indicating which KRS system holds the Customer Master Key referenced by CustomerEnvelopedWithKeyId, and a tenant identifier (e.g., TenantId).

In some embodiments, each record of table Tenant Service Key 802 corresponds to an encrypted tenant service key for a tenant. Each record contains a key identifier for the tenant service key (e.g., KeyId), a tenant master key identifier matching the key used for enveloping (e.g., MasterKeyId), the encrypted tenant service key (e.g., TSK CipherText), an initialization vector (e.g., iv), and a service identifier (e.g., ServiceId).

In some embodiments, each record of table Customer KRS 803 corresponds to a customer key release system. Each record contains a network location of a key release system (e.g., CustomerKRSURI), a public certificate for the key release system (e.g., CustomerPubCert), and a customer identifier (e.g., CustomerId).

In some embodiments, each record of table Customer 804 corresponds to a customer. Each record contains a customer identifier (e.g., CustomerId) and the name of the customer (e.g., customerName). In some embodiments, each record of table Tenant 805 corresponds to a tenant for a customer. Each record contains a tenant identifier (e.g., TenantId), the name of the tenant (e.g., tenantName), and a customer identifier for the tenant (e.g., CustomerId). In some embodiments, each record of table Service 806 corresponds to a service offered for a tenant. Each record contains a service identifier (e.g., ServiceId), the type of service (e.g., serviceType), and a description for the service (e.g., ServiceDesc).

Figure 8B:
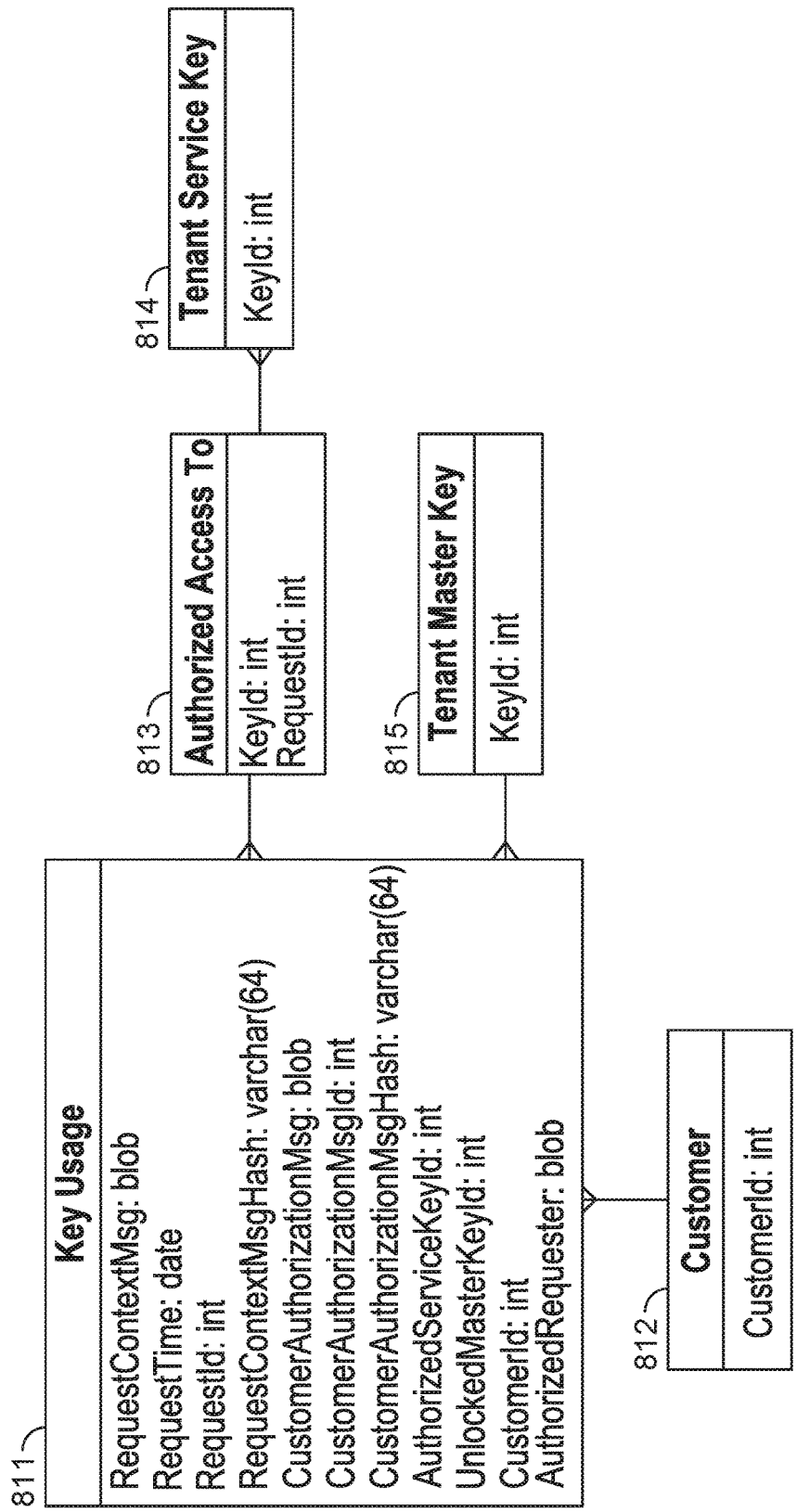
FIG. 8B is diagram illustrating an embodiment of a KMS Audit Log Database schema.

FIG. 8B is diagram illustrating an embodiment of a KMS Audit Log Database schema. In some embodiments, the schema of FIG. 8B is used for the audit database of the key management system. In some embodiments, KMS Audit DB 229 of FIG. 2A uses the schema of FIG. 8B. In the example, the KMS Audit Log Database schema comprises tables Key Usage 811, Customer 812, Authorized Access To 813, Tenant Service Key 814, and Tenant Master Key 815. The type of connection shown in FIG. 8B between tables 811, 812, 813, 814, and 815 indicates the relationship between tables, for example, multiple lines merging into a single line indicates a many-to-one relationship. In some embodiments, the tables 811-815 will comprise additional fields as appropriate.

In some embodiments, each record of table Key Usage 811 corresponds to a key release request and use. Each record contains the information associated with a key release request, including the context of a key release request (e.g., RequestContextMsg), a request time of the request (e.g., RequestTime), a request identifier (e.g., RequestId), and a hash of the request context message (e.g., RequestContextMsgHash). Each record also contains information associated with the authorization of the key release, including a customer authorization message (e.g., CustomerAuthorizationMsg), a customer authorization message identifier (e.g., CustomerAuthorizationMsgId), and a hash of the customer authorization message (e.g., CustomerAuthorizationMsgHash). Each record further contains an identifier for the tenant service key for the authorized service (e.g., AuthorizedServiceKeyId), an identifier for the unlocked tenant master key used to encrypt the tenant service key (e.g., UnlockedMasterKeyId), a customer identifier (e.g., CustomerId), and information of the authorized requester (e.g., AuthorizedRequester).

In some embodiments, each record of table Customer 812 corresponds to the customer that a key release was request from. Each record contains a customer identifier (e.g., CustomerId). In some embodiments, each record of table Authorized Access To 813 corresponds to the information related to the key requested. Each record contains a key identifier (e.g., KeyId) and a request identifier (e.g., RequestId). In some embodiments, each record of table Tenant Service Key 814 corresponds to the information related to the tenant service key requested. Each record contains a key identifier (e.g., KeyId). In some embodiments, each record of table Tenant Master Key 815 corresponds to the information related to the tenant master key needed to decrypt the requested tenant service key. Each record contains a key identifier (e.g., KeyId).

Figure 8C:
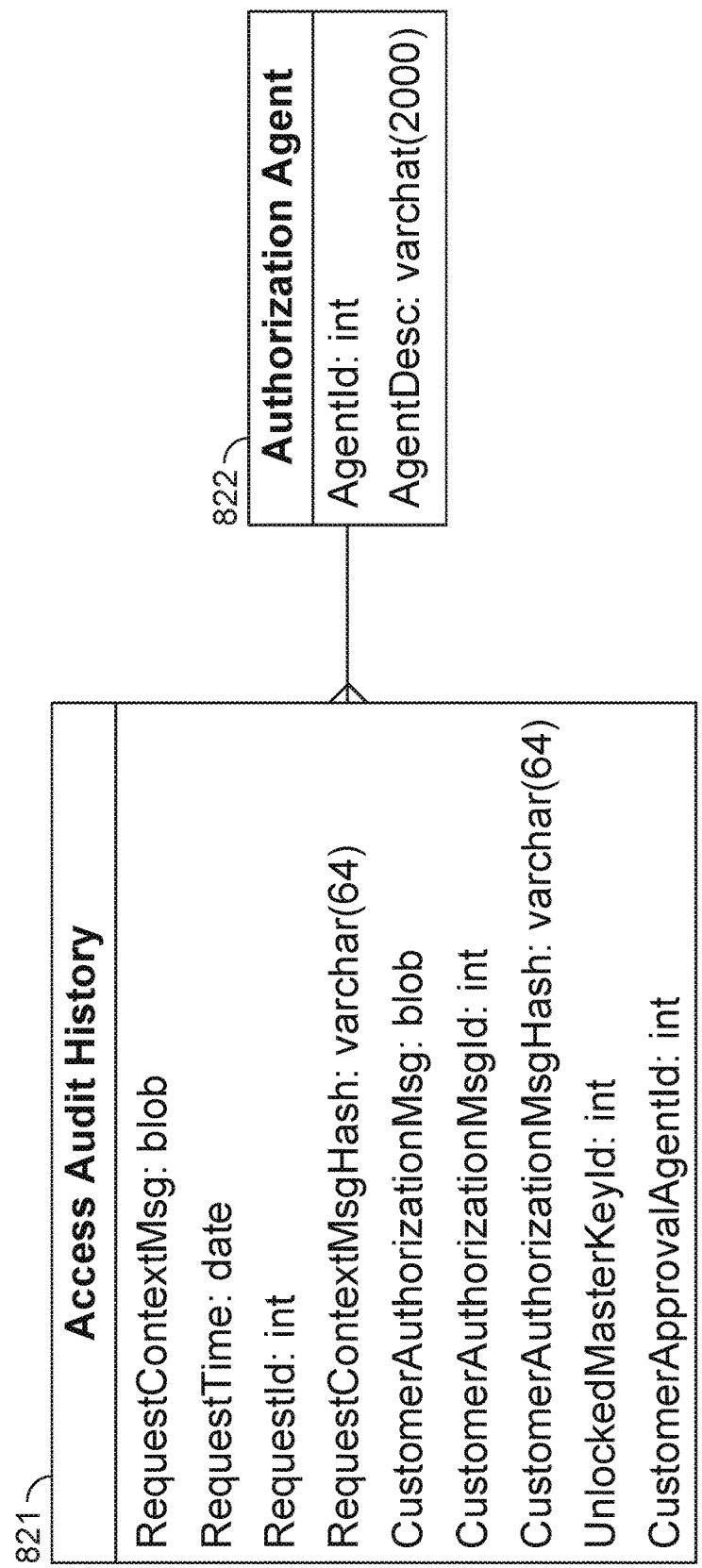
FIG. 8C is diagram illustrating an embodiment of a KRS Audit Log Database schema.

FIG. 8C is diagram illustrating an embodiment of a KRS Audit Log Database schema. In some embodiments, the schema of FIG. 8C is used for the audit database of the key release system. In some embodiments, KRS Audit DB 234 of FIG. 2A uses the schema of FIG. 8C. In the example, the KRS Audit Log Database schema comprises tables Access Audit History 821 and Authorization Agent 822. The type of connection shown in FIG. 8C between tables 821 and 822 indicates the relationship between tables, for example, multiple lines from table 821 merging into a single line at table 822 indicates a many-to-one relationship. In some embodiments, the tables 821 and 822 will comprise additional fields as appropriate.

In some embodiments, each record of table Access Audit History 821 corresponds to a key release request and access. Each record contains the information associated with a key release request, including the context of a key release request (e.g., RequestContextMsg), a request time of the request (e.g., RequestTime), a request identifier (e.g., RequestId), and a hash of the request context message (e.g., RequestContextMsgHash). Each record also contains information associated with the authorization of the key release, including a customer authorization message (e.g., CustomerAuthorizationMsg), a customer authorization message identifier (e.g., CustomerAuthorizationMsgId), and a hash of the customer authorization message (e.g., CustomerAuthorizationMsgHash). Each record further contains an identifier for the unlocked tenant master key (e.g., UnlockedMasterKeyId) and an identifier of the customer approval agent (e.g., CustomerApprovalAgentId). In some embodiments, each record of table Authorization Agent 822 corresponds to the information related to the authorization agent. Each record contains an agent identifier (e.g., AgentId) and a description of the agent (e.g., AgentDesc).

Cardinality of Customers to Tenants to Services

Using the described techniques herein, in some embodiments, the process for securely storing data is scaled to multiple customers and redundancy is incorporated to improve reliability and speed among other factors. In some embodiments, multiple HSM Clusters are accessible by a key release module, and each customer will have one customer key per HSM Cluster. Each customer can have one or more tenants, and each tenant associated with a customer has a unique tenant master key. Each tenant master key is secured by enveloping it with a customer key. For example, a customer key is used to encrypt each tenant master key owned by a customer. For each tenant, one or more tenant service keys exist. For example, each tenant service key is enveloped by a tenant master key.

In some embodiments, a master key is shared across different tenants for a customer. This non-tenanted master key is at the same level in the enveloping hierarchy as a tenant master key but is not specific to a particular customer's tenant. The non-tenanted master key is enveloped by the customer key and each tenant service key is enveloped by the non-tenanted master key. In some embodiments, more than one master key is shared across different tenants for a customer.

Caching Keys

In some embodiments, the KMS Engine is capable of caching an unencrypted tenant master key at the KMS Engine. In some embodiments, the KMS Engine is KMS Engine 224 in FIG. 2A. In the event the policy setting directs the KMS Engine to cache an unencrypted tenant master key in memory, the KMS Engine will generate an unlock request without including the encrypted tenant master key. The unlock request generates a key release approval by the key release system which is logged as an unlock result in the KRS Audit Database. No encrypted tenant key is transmitted to the KRS Module and no HSM request is generated. In this configuration, the security of the process is improved by not transmitting key material in the protocol between the key management system and the key release system. An audit trail is maintained by specifying a unique identifier for the requested release of a tenant master key and logging the key release authorization.

In some embodiments, the KMS Engine caches a second encrypted tenant master key encrypted with the public key of the KMS Engine instead of an unencrypted tenant master key. The second encrypted tenant master key can be decrypted by the KMS Engine without transmitting the key to the key release system. In this scenario, no unencrypted tenant master keys are cached at the KMS Engine.

Public/Private Key Pairs

In the technology described herein, various public/private key pairs are used, for example, public/private keys are used to validate requests and responses. In some embodiments, the private key resides securely in the appropriate module and only the public key is accessible outside the module. In some embodiments, MU Key 214, KMS Key 225, and KRS Key 233 are RSA public/private key pairs. For example, the public key corresponding to a private/public key pair is publicly accessible and can be validated using a trusted certificate authority or out of band pre-exchange of public keys. In some embodiments, a public key in the form of a certificate is included in messages, such as the initial request object, passed between networked components. In various embodiments, the messages sent between modules, such as between the management utility and KMS API Gateway; between the KMS API Gateway and KMS Engine; between the KMS Engine and KRS Module; between the KMS Engine and user/administrator of the management utility; between the KMS Engine and the management utility; and between any other appropriate modules are signed using a private key and verified using the corresponding public key.

Symmetric Keys

In the technology described herein, various symmetric keys are relied on for symmetric encryption and for enveloping keys. In some embodiments, customer key, tenant master key, and tenant service keys are symmetric keys. In some embodiments, Customer Key 238, Encrypted TMK 227, and Encrypted TSK 228 are symmetric keys. As one example, customer key (or customer enveloping key) is the top level key stored in a HSM. The HSM can be managed by the software as a service provider, the customer, or a third-party. The customer key never leaves the HSM and is used to perform encrypt/decrypt operations on child keys that it protects. In some embodiments, the keys are AES-256 secret keys using GCM or EAX mode ciphers and generated by a secure source of entropy such as an HSM. As another example, tenant master key is the top level key per tenant and is used to encrypt/decrypt all tenant service keys for that tenant. In some embodiments, the tenant master key is encrypted multiple times by different parent keys such that if one key cannot be reached, another can be used to decrypt the tenant master key. As another example, tenant service key is the secret key used to encrypt data that a particular service owns. Each tenant service key is encrypted by the tenant master key when stored in the key management system encrypted key database.

Key Rotation

In the technology described herein, the use of multiple enveloping keys including a customer key, tenant master key, and tenant service key, provides for multiple types of key rotations. In many instances, when a key is changed, only a subset of the keys must be rotated. In some embodiments, a key is rotated based on schedule, demand, when a key has been compromised, when administration change occurs, data migration, or any other appropriate reason.

In the event of a customer key rotation, each tenant master key for the particular customer is decrypted using the old customer key and encrypted using the new customer enveloping key. Rotating a customer key requires access to a HSM. If redundant HSMs are configured then rotation requires access to all HSMs storing the customer key. In some embodiments, when customer key rotation occurs, the current customer key K1 is rotated to a new customer key K2. The new customer key K2 is marked as the current customer key. The key release system will honor requests for K1 but extends the unlock response to include both K1 and K2. In some embodiments, the request for K1 is honored for a pre-configured period of time. In response to receiving an unlock response with two keys K1 and K2, the key management system is responsible for updating the tenant master key by enveloping it with new customer key K2. In some embodiments, once the tenant master key has been encrypted using K2, the rotation is complete.

In some embodiments, if a customer key has been rotated, the unlock response from the key release system comprises additional fields. In some embodiments, the additional fields comprise the customer key identifier of the new customer key, the requested tenant master key encrypted with the new customer key, and an initialization vector for encryption. Upon receipt of the new fields, the key management system is responsible for updating the stored encrypted tenant master key, the customer key version number, and the initialization vector values.

In the event of a tenant master key rotation, each tenant service key for the particular tenant is decrypted using the old tenant master key and encrypted using a new tenant master key. In some embodiments, the number of tenant service keys is bound by the number of services provided. Rotating a tenant master key requires access to a HSM to decrypt the encrypted old tenant master key, generating a new tenant master key, and access to the HSM to encrypt the newly generated tenant master key. In some embodiments multiple HSMs exist and are accessed. In some embodiments, the newly generated tenant master key is first encrypted using the public key of the key release system and then transmitted to the key release system. The key release system decrypts the newly generated tenant master key using its private key and encrypts it using a HSM and customer key. The newly encrypted tenant master key enveloped with the customer key is received by the key management system where it is stored in an encrypted key database.

In some embodiments, on rotation of a tenant master key, the key release request comprises an indication that the request is for key rotation. As one example, the request object includes a field "operation" that is set to "decryptForPeriodicRotation". In some embodiments, key releases for key rotation are automated and bypass a requirement that a human administrator release the key. For example, for key rotations, a key release system provides automatic approval instead of pending approval by a human administrator to release the key. In some embodiments, the request object includes a field "operation" that is set to "decryptForEmergencyRotation" and used to differentiate an emergency rotation. In some embodiments, emergency rotations are automatically approved without authorization from a human administrator. In some embodiments, the customer receives a notification on key rotation. For example, a customer receives a signed email after an emergency key rotation.

In the event of an individual tenant service key rotation, the tenant service key for the particular tenant is decrypted using the tenant master key and a new tenant service key is created and encrypted using the tenant master key. The tenant master key is decrypted using a HSM and the customer key by initiating a key release. In some embodiments, on rotation of a tenant service key, the key release request comprises an indication that the request is for tenant service rotation. As one example, the request object includes a field "operation" that is set to "decryptForTSKCreation" for creation of a tenant service key and set to "decryptForTSKRotation" for rotation of a tenant service key. In some embodiments, when an operation is a paused or halted, an authorized release for the tenant service key expires. The tenant service key must be re-unlocked to continue operations on data protected by the key.

In some embodiments, tenant service key rotation is implemented by the service that operates on the secure data repository. In some embodiments, the key management system engine will periodically, based on policy and/or configuration, generate a new tenant service key to initiate key rotation. The new tenant service key is marked as the current version of the key. Services that rely on the tenant service key will acknowledge the key has been updated and begin to rotate the old tenant service key for the new tenant service key.

In the case of a security incident, for example, when one or more keys are compromised, all keys may need to be rotated at all layers at once. In some embodiments, the rotation begins at the top of the key chain with the customer key, completing with the tenant service key. In some embodiments, the complete rotation requires coordinating with all customers to initiate the immediate rotation of keys.

Audit Verification

In some embodiments, a private blockchain is used to indicate that all participants in the system and transactions are verified and known using the issuance of certificates/public key infrastructure. Participants in the system (KMS and KRS) agree to each proposed addition by mutually signing a next block added to the blockchain. A copy of the private blockchain is stored in FIG. 2A KMS audit DB 229 and KRS audit DB 234. In some embodiments, a blockchain comprises a set of underlying data structures (e.g., Merkle trees, hash chains, etc.) and protocols (e.g., a communication protocol—for example, gossip) that enable verification of occurrence of one or more transactions for audit purposes and for agreement among distributed system participants. In some embodiments, a private blockchain system allows only specific named parties to write to the blockchain, unlike a public blockchain (e.g., BitCoin's blockchain) which allows any party to write to the blockchain. In some embodiments, a private blockchain allows writing to the blockchain using trusted certificate. In some embodiments, a private blockchain allows other parties (e.g., parties without trusted certificates) to verify and/or other parties to read the blockchain. In some embodiments, no work factor is required for writing to the blockchain enabling high speed auditing of key management transactions. In some embodiments, a public blockchain has artificial slowness (using the work factor) built in to deter double spending of coins (and other issues). In some embodiments, a private blockchain system uses public blockchain system data structures for key management audit needs.

Figure 9:
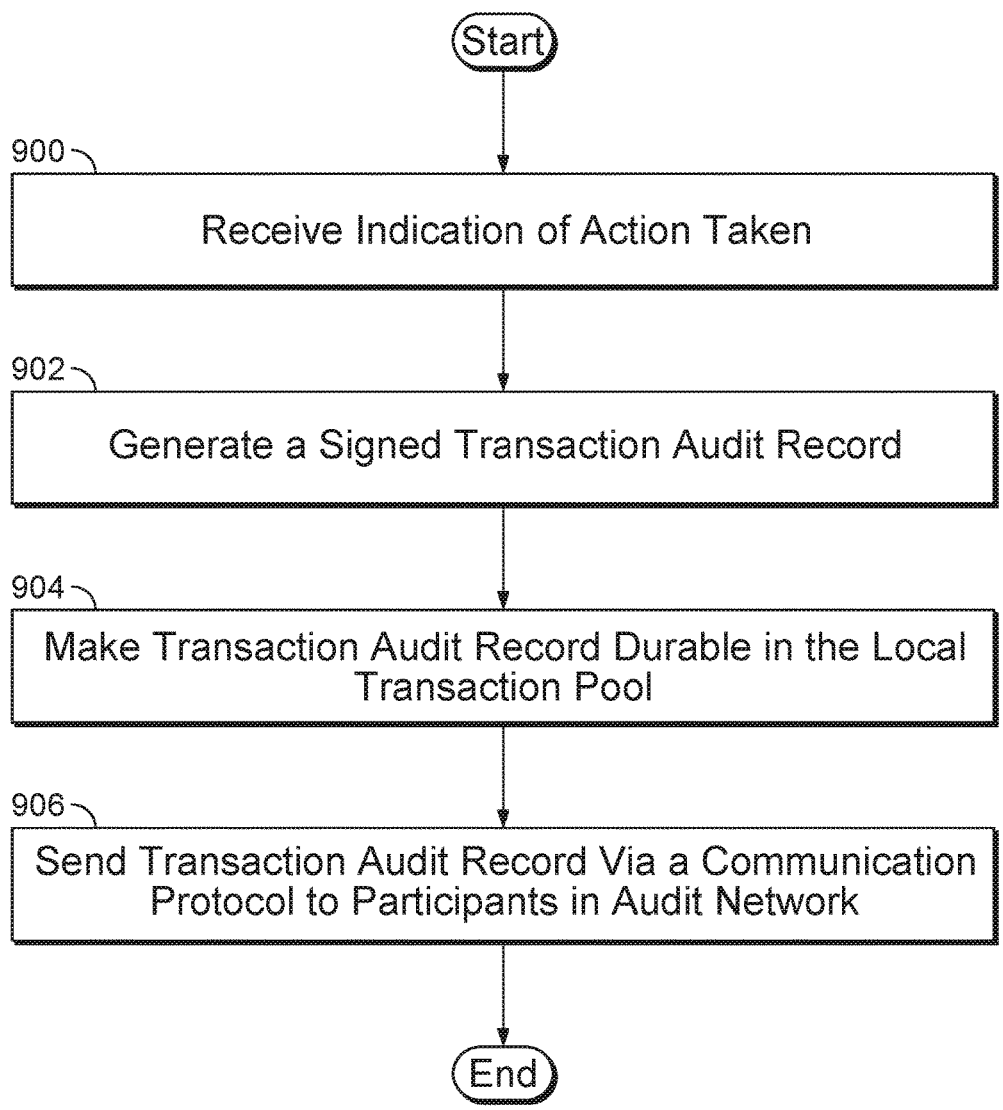
FIG. 9 is a flow diagram illustrating an embodiment of a process for audit records.

FIG. 9 is a flow diagram illustrating an embodiment of a process for audit records. In some embodiments, the process of FIG. 9 is used for transaction audit records stored by KRS Audit Agent 254 in KRS audit DB 234 or by KMS Audit Agent 244 in KMS audit DB 229 in FIG. 2A. In the example shown, in 900 an indication is received of an action taken. For example an action taken may comprise one or more of the following: a key request by the KMS, a consumption of a released key by the KMS, a key released by the KMS, a key released by the KRS, or any other appropriate action. In 902, a KMS Audit Agent or KRS Audit Agent will use their Private Key to cryptographically sign over the contents of a transaction using RSA SHA256 or equivalent algorithm. For example, the KMS Audit Agent or the KRS Audit Agent generates a signed transaction audit record, as appropriate. In some embodiments, signing a transaction comprises using a private key and a message content and a signing algorithm to produce a signature. In some embodiments, a signature verifying algorithm is able to accept or reject the message content given the signature and the public key associated with the private key used for producing the signature. In 904, transaction audit record is stored in the local transaction pool. For example, the transaction audit record is stored in a transaction pool in the Audit DB in the KMS system or the KRS system Audit DB. In 906, transaction audit record is sent via a communication protocol to all known audit agents in Secure Storage System. For example, the transaction audit record is sent to the KMS Audit Agent from the KRS Audit Agent or from the KRS Audit Agent to the KMS Audit Agent. In various embodiments, the communication protocol comprises a gossip protocol, a Paxos protocol, a Raft protocol, or any other appropriate protocol. In some embodiments, the communications protocol used for making the other nodes of a distributed system aware of a change that has occurred.

Figure 10:
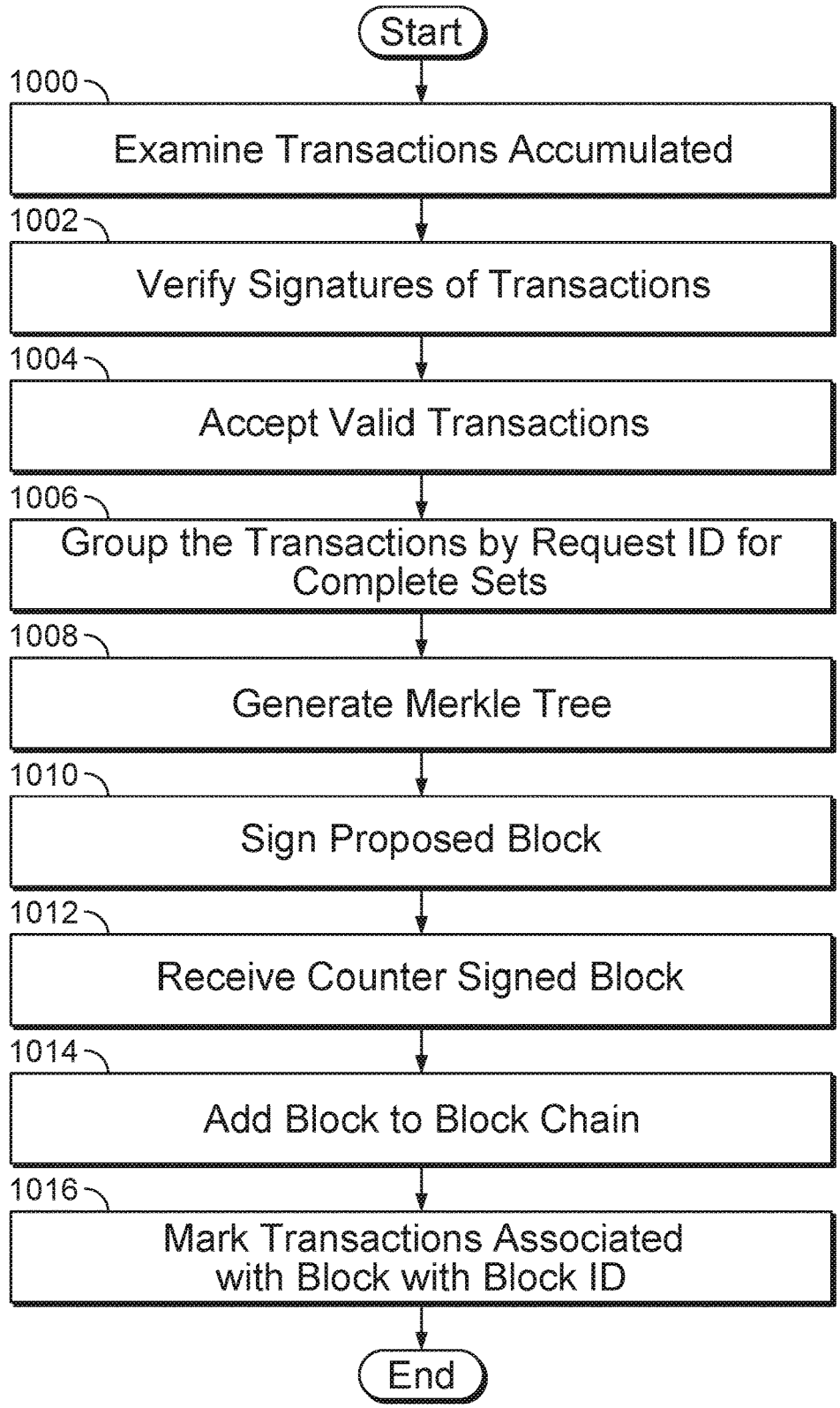
FIG. 10 is a flow diagram illustrating an embodiment of a process for audit records.

In some embodiments, a transaction has a format as follows:
{
"operation": "release",
"ctx": "requested",
"ts":millisTimestamp,
}
.
EncodedSignatureBytesB64UrlSafe FIG. 10 is a flow diagram illustrating an embodiment of a process for audit records. In some embodiments, the process of FIG. 10 is used for transaction audit records stored by KRS Audit Agent 254 in KRS audit DB 234 or by KMS Audit Agent 244 in KMS audit DB 229 in FIG. 2A. In the example shown, in 1000 transactions accumulated are examined. For example, the transaction audit records in a transaction pool of the KMS Audit DB or the KRS Audit DB are examined. In some embodiments, a transaction pool stores a number of transaction audit records. In 1002, the signatures of the transactions are verified. For example, the signatures of the transaction audit records stored in the transaction pool of the KMS Audit DB or the KRS Audit DB are verified by performing a signature verification using the known public key of the creator of the transaction. For example, a Key Release Request made by the KMS Engine will be signed with the Private Key of KMS, and either the KRS Audit Agent or the KMS Audit Agent can use the shared, known corresponding Public Key of KMS to verify the transaction signature using the RSA SHA256 signature verification algorithm. In 1004, transactions with valid signatures are accepted and stored in the local Audit DB. For example, in the event that the transaction signature is verified, the transaction associated with the signature is indicated as valid. In 1006, the transactions are grouped by request ID for complete sets. For example, transactions that are part of a complete set according to a request identifier (ID) are grouped together. In 1008, a Merkle tree is generated. For example, a request key transaction, a release key transaction, and a consume key transaction are grouped by request identifier (e.g., as associated with a request to store data or a request to retrieve data) and are hashed and stored in a Merkle tree. In some embodiments, a Merkle tree is a tree in which every non-leaf node is labeled with the hash of the labels or values (in case of leaves) of its child nodes. Merkle trees allow efficient and secure verification of the contents of large data structures. Merkle trees are a generalization of hash lists and hash chains. Key consumption is an audited action performed by the KMS Engine indicating what it did with the key it asked the KRS Module for. For example, the KMS Engine first requests KRS Module to decrypt the Tenant Master Key, KRS then releases the decrypted TMK, and finally the KMS Engine messages the KMS Audit agent to generate an audit record that it consumed/used the TMK to decrypt a TSK. This final leg of the audit flow is important because a $3^{rd}$ party attacker who intercepted or prevented the decrypted TMK from being returned, or the KMS Engine performing an unexpected action with the TMK could both be conditions to halt processing in the systems and cause a re-key, audit and/or investigation. In 1010, a proposed block is signed by the audit agent responsible for building the blockchain. In this model, only one audit agent, either in KMS or the KRS is designated at the block proposer/leader at any time. For example, a block associated with the Merkle tree is signed by the KMS Audit Agent and then the KRS Audit Agent using a private key (e.g., cryptographically signing). In some embodiments, the proposed block is generated using the Merkle tree. In 1012, a counter signed block is received. For example, a request is made to counter sign the proposed block, the signed block is transmitted to another system (e.g., from the KMS Audit Agent to the KRS Audit Agent or vice versa) and is verified and counter signed and the counter signed proposed block transmitted back. In 1014, the block is added to the blockchain. For example, the block is added to the local blockchain. This exchange should result in the KMS Audit DB and the KRS Audit DB eventually having identical copies of the signed blockchain at some point in time. In 1016, transactions associated with block are marked with block ID. For example, a transaction is marked with a block identifier.

In some embodiments, both the KMS and KRS audit agents are able to see whether transactions in their local transaction pool ever made it into the blockchain. In some embodiments, each participant (e.g., KMS and KRS audit agents, etc.) validates their copy of the blockchain. In some embodiments, verification of hashes and signatures protecting the chain ensures that no data has been altered or removed. In some embodiments, verification comprises cryptographic verification, where each participant's audit agent periodically traverses the local copy of the blockchain stored in the local Audit DB and computes each hash to the root of the chain. In some embodiments, when either the KMS Audit Agent in response to the KRS Audit Agent or visa versa, provides counter signature on a proposed block, it must validate the chain. In the event that a node has been removed or altered, the local verification fails and the proposed block is not counter signed. In some embodiments, when either the KMS Audit Agent or KRS Audit Agent provides an initial signature, it must validate the chain. In the event that a node has been removed or altered, a newly proposed end block will not match the blockchain and the proposed block is not signed. In some embodiments, the transaction is published on a public blockchain by the blockchain leader audit agent. Publishing text to a public blockchain further allows each participant to trust the other is acting as expected, as well as opens the key exchange to audit by other participants as desired. In various embodiments, the privacy of the transaction is preserved even when publishing by publishing a transaction id and/or system id and/or checksum in place of publishing actual transaction details. In some embodiments, transaction details are encrypted by a symmetric key known to both the KMS and the KRS before writing to the blockchain (e.g., a public blockchain) to further obscure transaction details. In some embodiments, a hash of the local block in the Leader Audit DB is written to the blockchain (e.g., a public blockchain), along with the block id to further obscure transaction details.

Figure 11:
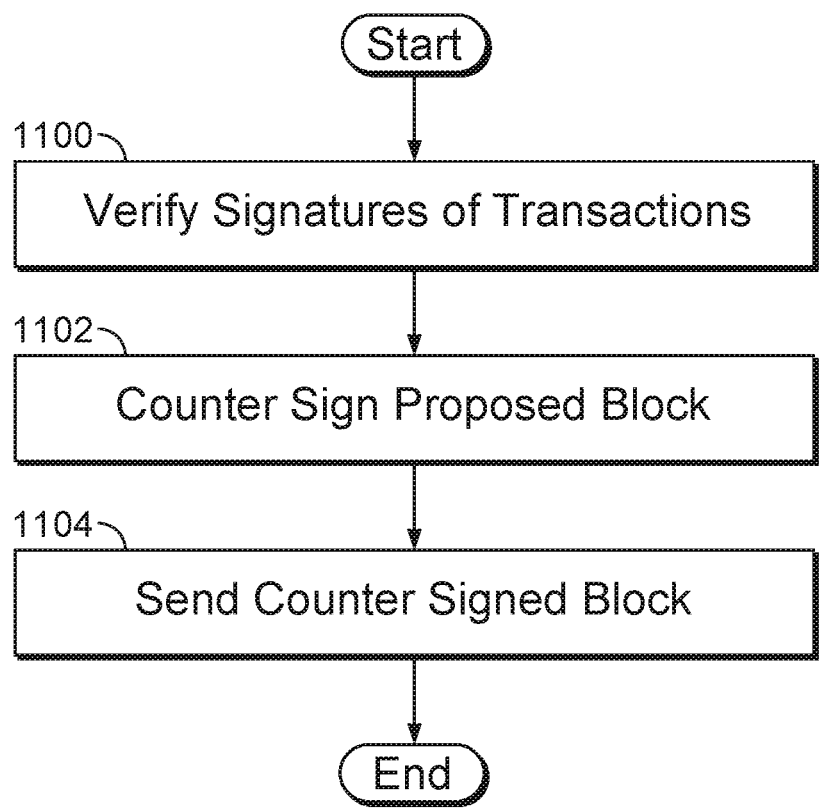
FIG. 11 is a flow diagram illustrating an embodiment of a process for audit records.

FIG. 11 is a flow diagram illustrating an embodiment of a process for audit records. In some embodiments, the process of FIG. 11 is used to provide a counter signed block received in 1012 of FIG. 10. In the example shown, in 1100 signatures of transactions are verified. For example, transactions of the block or blockchain local to the KMS Audit DB or the KRS Audit DB are verified. In 1102, the proposed block is counter signed. For example, in the event that the transaction signatures are verified, the proposed block is counter signed. In 1104, the counter signed block is sent. For example, the counter signed block is sent to the original audit agent. For example, KRS Audit Agent counter signs the block KMS Audit Agent wants to publish, and sends it back to KMS Audit Agent for addition to the copy of the blockchain the KMS Audit DB holds.

Figure 12:
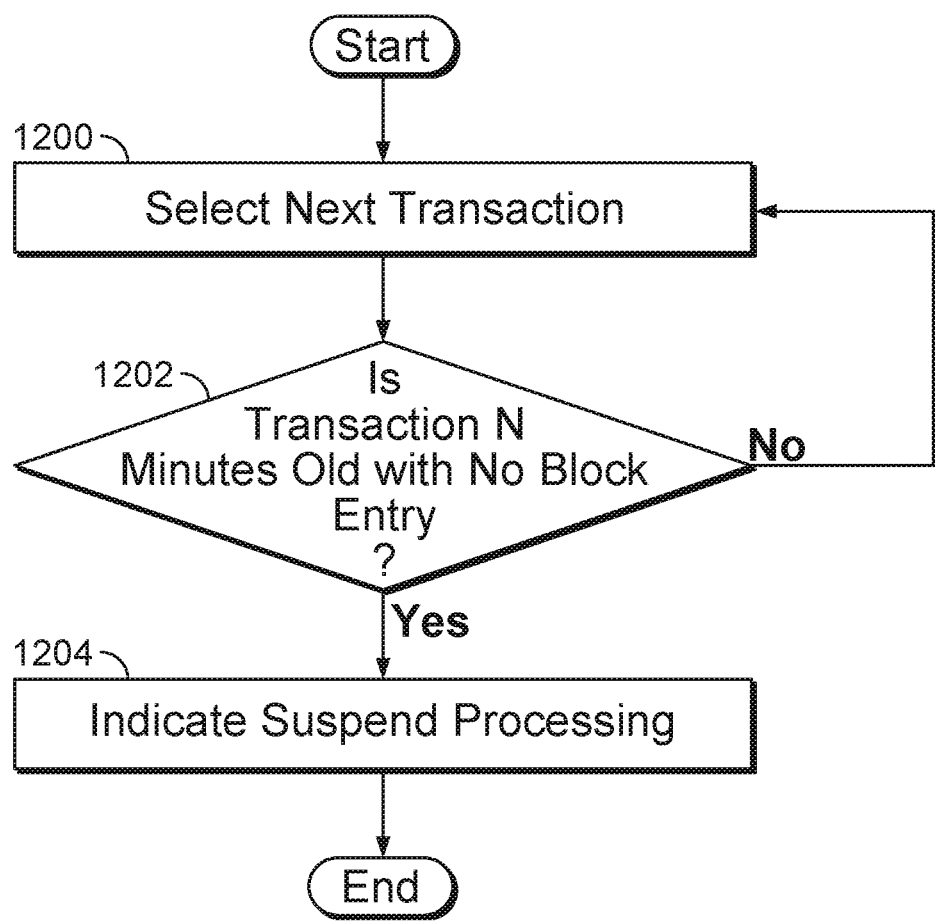
FIG. 12 is a flow diagram illustrating an embodiment of a process for audit records.

FIG. 12 is a flow diagram illustrating an embodiment of a process for audit records. In some embodiments, the process of FIG. 9 is used for transaction audit records stored by KRS Audit Agent 254 in KRS audit DB 234 or by KMS Audit Agent 244 in KMS audit DB 229 in FIG. 2A. In the example shown, a next transaction is selected. In 1202, it is determined whether the transaction is N minutes old with no block entry. For example, it is determined whether the transaction has existed for a system configured time period (e.g., N minutes) without being incorporated into the local private blockchain. In the event that the transaction is not N minutes old with no blockchain id entry, control passes to 1200. In the event that the transaction is N minutes old with no block entry, control passes to 1204. In 1204, it is indicated to suspend processing, and the process ends.

Figure 13:
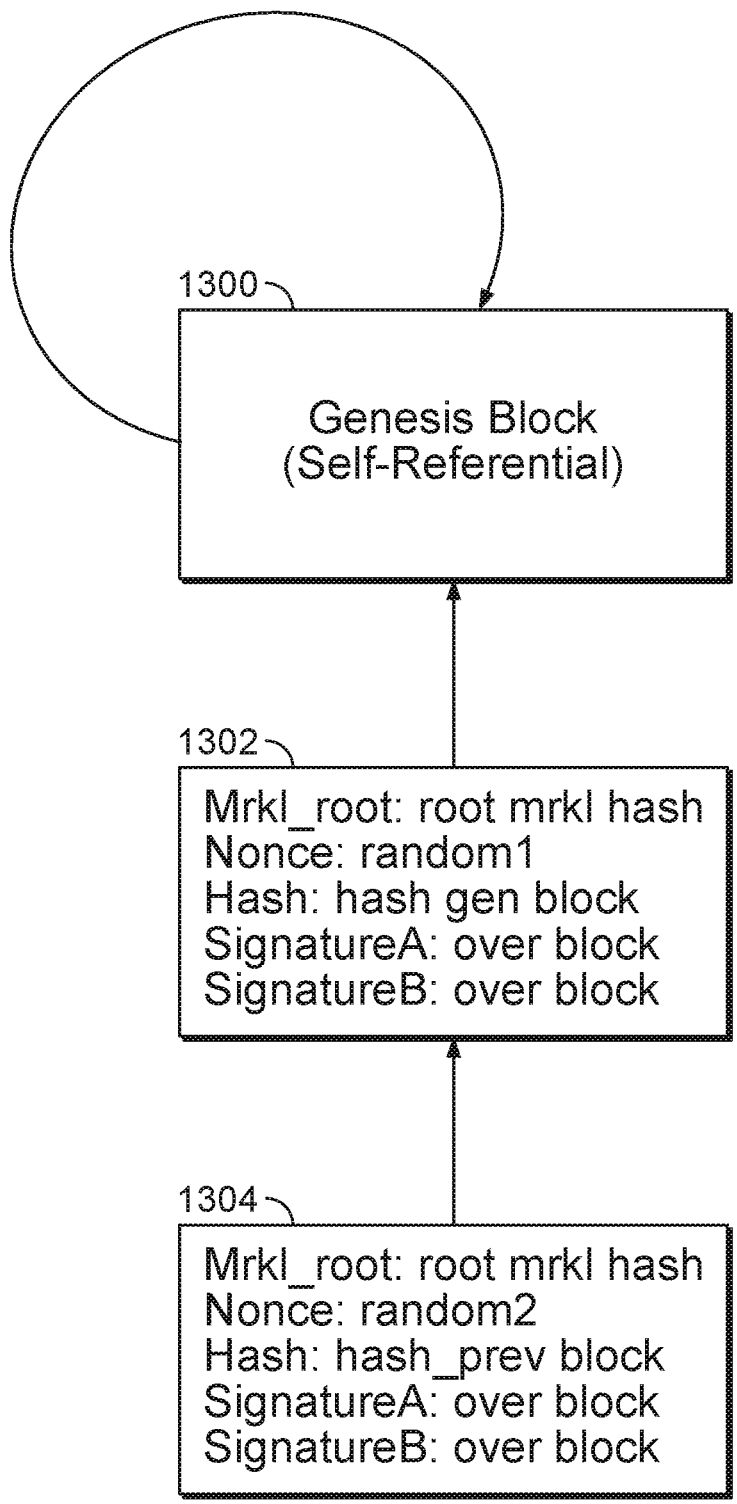
FIG. 13 is a block diagram illustrating an embodiment of a blockchain.

FIG. 13 is a block diagram illustrating an embodiment of a blockchain. In some embodiments, the blockchain of FIG. 13 is used in 1014 of FIG. 10. In the example shown, genesis block 1300 is self-referential. In some embodiments, a genesis block is the first block of a blockchain. In some embodiments, the genesis block is hardcoded into system software. In some embodiments, the genesis block does not reference a previous block. In some embodiments, a blockchain data structure comprises a chain of blocks in which a block of the blockchain points to a previous block using a hash. In some embodiments, the genesis block hashes over itself. Block 1032 points to genesis block 1300. Block 1302 includes mrkl_root as root mrkl hash, nonce as random1, hash as hash gen block, signatureA as over block, and signature as over block. Block 1034 points to genesis block 1302. Block 1304 includes mrkl_root as root mrkl hash, nonce as random2, hash as hash gen block, signatureA as over block, and signature as over block.

Figure 14:
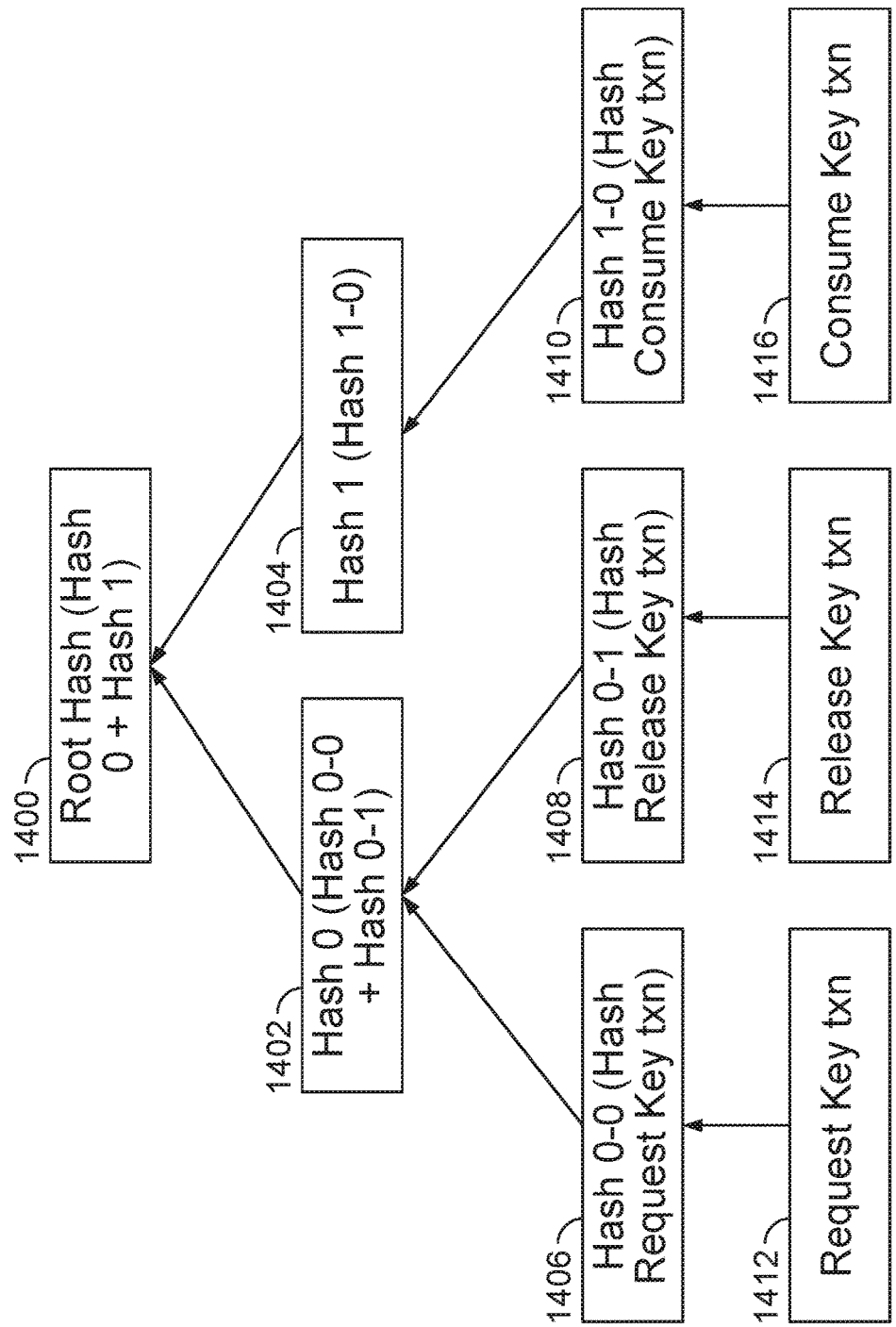
FIG. 14 is a block diagram illustrating an embodiment of a Merkle tree.

FIG. 14 is a block diagram illustrating an embodiment of a Merkle tree. In some embodiments, the Merkle tree of FIG. 14 is generated using 1008 of FIG. 10. In the example shown, a Merkle tree is based at least in part on one or more of the following: a request key transaction, a release key transaction, a consume key transaction, or any other appropriate transaction. In various embodiments, the key associated with the transaction that is used for the Merkle tree comprises one or more of the following: a tenant service key, a tenant master key, a customer key, or any other appropriate key. In the example shown, request key txn 1412 points to hash 0-0 1406 that is generated by hashing request key txn. Release key txn 1414 points to hash 0-1 1408 that is generated by hashing release key txn. Consume key txn 1416 points to hash 1-0 1410 that is generated by hashing consume key txn. Hash 0 1402 is generated by combining hash 0-0 1406 and hash 0-1 1408. In some embodiments, the combining of hash 0-0 1406 and hash 0-1 1408 comprises hashing hash 0-0 1406 and hash 0-1 1408. Hash 1 1404 is generated from hash 1-0 1410. In some embodiments, the generating from hash 1-0 1410 comprises hashing hash 1-0 1410. Root hash 1400 is generated by combining hash 0 1402 and hash 1 1404. In some embodiments, the generating from hash 0 1402 and hash 1 1404 by hashing hash 0 1402 and hash 1 1404.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for secure storage audit verification comprising:
   a transaction pool; and
   a processor configured to:
      verify a transaction stored in the transaction pool, wherein the transaction comprises one of the following: a key request by a Key Management System (KMS), a consumption of a released key by the KMS, a key released by the KMS, or a key released by a Key Release System (KRS);
      sign a proposed block, wherein the proposed block is based at least in part on the transaction;
      receive a counter signed proposed block;
      add the counter signed proposed block to a blockchain;
      determine whether the transaction has occurred based at least in part on the blockchain;
      in response to a determination that the transaction has occurred, indicate that secure storage associated with the transaction is verified, and
      in response to a determination that the transaction has not occurred, indicate that secure storage processing is suspended.

2. A system of claim 1, wherein the processor is further configured to group the transaction using a request identifier.

3. A system of claim 1, wherein signing the proposed block comprises cryptographically signing the proposed block.

4. A system of claim 1, wherein the processor is further configured to generate a Merkle tree using the transaction.

5. A system of claim 4, wherein the processor is further configured to generate a proposed block using the Merkle tree.

6. A system of claim 5, wherein the Merkle tree is based at least in part on one or more of the following: a request key transaction, a release key transaction, or a consume key transaction.

7. A system of claim 6, wherein a key associated with the transaction that is used for the Merkle tree comprises one of the following: a tenant service key, a tenant master key, or a customer key.

8. A system of claim 1, wherein the processor is further configured to request a counter sign for the proposed block.

9. A system of claim 8, wherein the processor is further configured to request the counter signed proposed block by requesting a counter signature for the proposed block.

10. A system of claim 8, wherein the counter sign for the proposed block is based at least in part on a verification of signatures of transactions associated with the proposed block.

11. A system of claim 8, wherein the counter sign request is transmitted from a key management system to a key release system.

12. A system of claim 11, wherein the counter signed proposed block is transmitted from a key release system to a key management system.

13. A system of claim 1, wherein the processor is further configured to mark the transaction with a block identifier.

14. A system of claim 1, wherein the processor is further configured to transmit the blockchain to the key release system from the key management system.

15. A method for secure storage audit verification comprising:

verifying, using a processor, a transaction stored in the transaction pool, wherein the transaction comprises one of the following: a key request by a Key Management System (KMS), a consumption of a released key by the KMS, a key released by the KMS, or a key released by a Key Release System (KRS);

signing a proposed block, wherein the proposed block is based at least in part on the transaction;

receiving a counter signed proposed block;

adding the counter signed proposed block to a blockchain;

determining whether the transaction has occurred based at least in part on the blockchain;

in response to a determination that the transaction has occurred, indicating that secure storage associated with the transaction is verified, and in response to a determination that the transaction has not occurred, indicating that secure storage processing is suspended.

16. A computer program product for secure storage audit verification, the computer program product being embodied in a non-transitory computer readable storage medium and comprising computer instructions for:

verifying, using a processor, a transaction stored in the transaction pool, wherein the transaction comprises one of the following: a key request by a Key Management System (KMS), a consumption of a released key by the KMS, a key released by the KMS, or a key released by a Key Release System (KRS);

signing a proposed block, wherein the proposed block is based at least in part on the transaction;

receiving a counter signed proposed block;

adding the counter signed proposed block to a blockchain;

determining whether the transaction has occurred based at least in part on the blockchain;

in response to a determination that the transaction has occurred, indicating that secure storage associated with the transaction is verified, and in response to a determination that the transaction has not occurred, indicating that secure storage processing is suspended.

\* \* \* \* \*

UNITED STATES PATENT AND TRADEMARK OFFICE
CERTIFICATE OF CORRECTION

PATENT NO. : 10,460,118 B2
APPLICATION NO. : 15/252060
DATED : October 29, 2019
INVENTOR(S) : Bjorn Hamel and Jonathan David Ruggiero Page 1 of 1

It is certified that error appears in the above-identified patent and that said Letters Patent is hereby corrected as shown below:

In the Specification

In Column 29, Line 49, delete "FIG. 9" and insert --FIG. 12--, therefor.
In Column 29, Line 52, after "example shown", insert --in 1200--, therefor.

Signed and Sealed this
Seventh Day of April, 2020

Andrei Iancu
*Director of the United States Patent and Trademark Office*